US009477673B2

(12) United States Patent
Dwan et al.

(10) Patent No.: US 9,477,673 B2
(45) Date of Patent: Oct. 25, 2016

(54) HEURISTICS FOR SELECTING AND SAVING CONTENT TO A SYNCED ONLINE CONTENT MANAGEMENT SYSTEM

(71) Applicant: Dropbox, Inc., San Francisco, CA (US)

(72) Inventors: Michael Dwan, San Francisco, CA (US); Daniel Kluesing, Menlo Park, CA (US)

(73) Assignee: Dropbox, Inc., San Francisco, CA (US)

(*) Notice: Subject to any disclaimer, the term of this patent is extended or adjusted under 35 U.S.C. 154(b) by 454 days.

(21) Appl. No.: 14/035,652

(22) Filed: Sep. 24, 2013

(65) Prior Publication Data
US 2015/0088817 A1  Mar. 26, 2015

(51) Int. Cl.
G06F 17/30 (2006.01)
G06Q 30/02 (2012.01)
G06F 3/0481 (2013.01)
G06F 3/01 (2006.01)

(52) U.S. Cl.
CPC ......... *G06F 17/30115* (2013.01); *G06F 3/017* (2013.01); *G06F 3/0481* (2013.01); *G06Q 30/0207* (2013.01)

(58) Field of Classification Search
CPC .................. G06F 17/30575; G06F 17/30286; G06F 17/30067
USPC ........................................................ 707/610
See application file for complete search history.

(56) References Cited

U.S. PATENT DOCUMENTS

| 6,072,482 | A | 6/2000 | Moon et al. |
| 8,407,613 | B2 | 3/2013 | Hope |
| 8,418,257 | B2 | 4/2013 | Hoogerwerf et al. |
| 2003/0009685 | A1* | 1/2003 | Choo et al. ................. 713/200 |
| 2004/0255137 | A1* | 12/2004 | Ying ............................ 713/193 |
| 2007/0073688 | A1* | 3/2007 | Fry ................................... 707/6 |
| 2008/0313554 | A1 | 12/2008 | Ostergaard et al. |
| 2010/0265185 | A1 | 10/2010 | Oksanen |
| 2011/0179368 | A1 | 7/2011 | King et al. |
| 2012/0036460 | A1 | 2/2012 | Cieplinski et al. |
| 2012/0052918 | A1 | 3/2012 | Yang et al. |
| 2012/0072850 | A1* | 3/2012 | Megiddo et al. ........... 715/745 |
| 2012/0110515 | A1* | 5/2012 | Abramoff et al. .......... 715/854 |
| 2012/0210214 | A1* | 8/2012 | Yoo ...................... G06F 3/0482 715/702 |

(Continued)

OTHER PUBLICATIONS

Niklas Norén, Eva Svensson & Jeanette Telford, "Participants' Dynamic Orientation to Folder Navigation when Using a VOCA with a Touch Screen in Talk-in-Interaction"; Mar. 2013, vol. 29, No. 1, pp. 20-36; doi:10.3109/07434618.2013.767555.

*Primary Examiner* — Scott A Waldron
*Assistant Examiner* — Dongming Wang
(74) *Attorney, Agent, or Firm* — Hickman Palermo Becker Bingham LLP

(57) ABSTRACT

Embodiments are provided for using heuristics for selecting and saving content to a synced online content management system. In some embodiments, one or more content items and/or indices thereto may be received within a first application. For example, a user may receive a photograph within a text message application. In some embodiments, a first defined gesture may be detected by a user device and in response, a second application may open. In some embodiments, a second defined gesture may be detected, and in response a (a) store, (b) share, and/or (c) an assign to a collection, operation may be performed within the second application. Alternatively, these operations may be performed within the second application based on at least one predefined rule (without a second gesture required).

24 Claims, 13 Drawing Sheets

(56) References Cited

U.S. PATENT DOCUMENTS

| | | |
|---|---|---|
| 2012/0297400 A1* | 11/2012 | Hill et al. .................... 719/318 |
| 2012/0324368 A1 | 12/2012 | Putz et al. |
| 2013/0067392 A1 | 3/2013 | Leonard et al. |
| 2013/0191339 A1 | 7/2013 | Haden et al. |
| 2013/0227413 A1* | 8/2013 | Thorsander et al. ......... 715/716 |
| 2014/0244659 A1* | 8/2014 | Liu et al. ...................... 707/748 |
| 2015/0052430 A1* | 2/2015 | Dwan ................. G06F 3/04883 715/702 |

\* cited by examiner

HEURISTICS FOR SELECTING AND SAVING CONTENT TO A SYNCED ONLINE CONTENT MANAGEMENT SYSTEM

FIELD OF THE INVENTION

Various embodiments generally relate to gestures that allow a user to select, save, and organize one or more content items to a synced online content management system.

BACKGROUND

With the amount of content accessible by mobile devices continually increasing, organization and synchronization between a user's main device and their one or more additional devices has become increasingly difficult and time consuming. Prior to the influx of mobile devices into modern society, users receiving files on a local computer could manually place the files in one or more folders or directories with relative ease—due, at least in part, to the large amount of display "real estate" available with their local computer. However, mobile devices, while becoming increasingly more powerful and robust, do not provide the same display sizes, and therefore difficulty may arise for a user seeking to view files that are organized in various folders and/or directories with various organization schemes. Additionally, as mobile devices have both exponentially grown in variety and drastically decreased in cost, individuals may now possess multiple types of mobile devices. As such a case has become the societal norm, the ability to synchronize file structures and file contents between a user's multiple mobile devices in addition to efficiently organizing files stored on the multiple devices has become increasingly desirable.

SUMMARY

Systems, methods, and non-transitory computer readable media for supporting and interpreting heuristics to select and save content to a synced online content management system are provided. Such systems may include one or more processors, a display, and memory containing instructions.

Such methods may include receiving, within a first application on a user device, a content item or items, and/or an index or indexes to a content item. In some embodiments, the first application may be an SMS messaging application, an email application, a social media network application, a third party application, and/or a browser directed to an e-book download service, an audio and/or video download service, or a document download service. A first defined gesture may be detected on the user device, which may open a second application in response. For example, a "long press," a tap, a swipe, and/or a multi-finger touch may be detected on a touch-sensing display interface, or touch screen, on the user device.

In some embodiments, a second defined gesture from the user may be detected by the user device. For example, the user may provide a swipe, a flick, a tap, a hover motion, or any other gesture, or any combination thereof to the user device. In response to detecting the second gesture, a store operation, a share operation, and/or an assign to a collection operation may be performed on the content item or items, and/or the index or indexes to the content item(s) within the second application. In some embodiments, however, after the second application opens, a store operation, a share operation, and/or an assign to a collection operation may be performed within the second application on the content item or items, and/or the index or indexes to the content item(s) based on one or more predefined rules.

Such methods may alternatively include monitoring one or more first applications on the user device for receipt of one or more content items and/or one or more indexes to a content item. After receipt of the aforementioned item(s), a second application on the user device may automatically open. In some embodiments, after opening the second application, the user may be notified that the at least one content item has been received. A defined gesture from the user may be detected on the user device, and in response to detecting the gesture, a store operation, a share operation, and/or an assign to a collection operation may be performed within the second application on the one or more content items, and/or one or more indexes to the content item. In some embodiments, however, after the second application opens, a store operation, a share operation, and an assign to a collection operation may be performed within the second application on the one or more content items, and/or one or more indexes to the content item based on one or more predefined rules.

BRIEF DESCRIPTION OF THE DRAWINGS

The above and other aspects and advantages of the invention will become more apparent upon consideration of the following detailed description, taken in conjunction with accompanying drawings, in which like referenced characters refer to like parts throughout, and in which.

DETAILED DESCRIPTION OF THE DISCLOSURE

Figure 1:
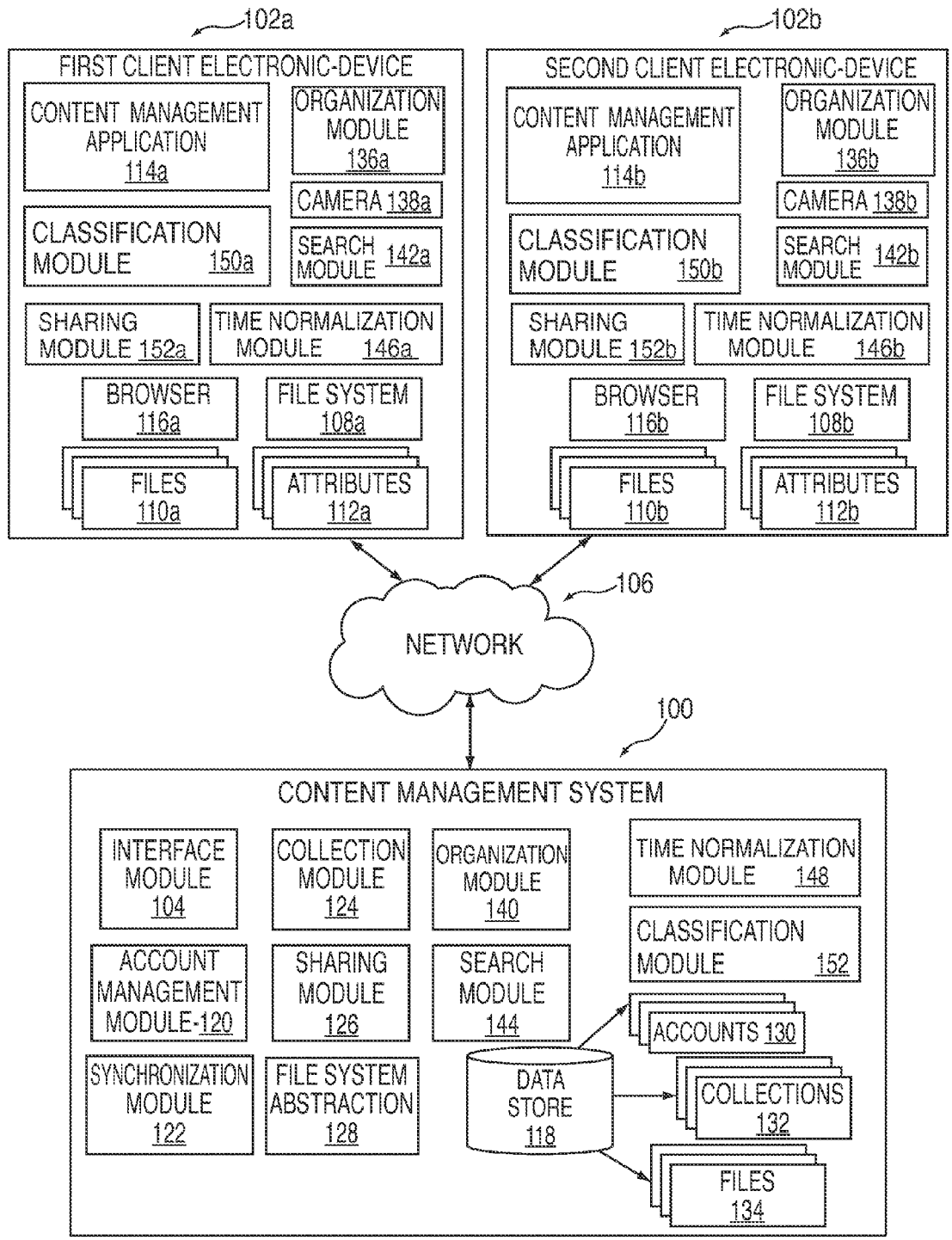
FIG. 1 is an exemplary system for providing heuristics to select and save content to a synced online content management system in accordance with various embodiments.

Methods, systems, and computer readable media for supporting and interpreting gestures to select and save content to a synced content management system are provided. Exemplary gestures may include motions performed by a user on or to a touch screen of a user device that may correspond to one or more functions. In some embodiments, gestures may include, for example: long presses, swipes, flicks, hand waves, hovers, presses with one or more fingers, or various combination thereof.

In some embodiments, a file hierarchy may be used by a content management system. Functions performed, for example, on a user device may be automatically synchronized to the content management system. Multiple devices may each access the content management system and, therefore, each may be synchronized to the content management system or to each of the content management systems and all other user devices on which a client of the content management system is resident. In some embodiments, the file hierarchy may be a tree structure including a root level and multiple branches. For example, a file may initially be placed at the root level and/or then subsequently, via one or more gestures, be placed on a branch extending from the root level.

For purposes of description and simplicity, methods, systems and computer readable media will be described for supporting and interpreting gestures for selecting and saving content, and in particular, using gestures to select and save content to various portions of a file hierarchy that may be synced with an online content management system. It is noted that the terms "device" and "content management system" are used herein to refer broadly to a wide variety of storage providers and data management service providers, electronic devices and mobile devices, as well as to a wide variety of types of content, files, portions of files, and/or other types of data. The term "user" is also used herein broadly, and may correspond to a single user, multiple users, authorized accounts, an application or program operating automatically on behalf of, or at the behest of a person, or any other user type, or any combination thereof. The term "gesture" and "gestures" are also used herein broadly, and may correspond to one or more motions, movements, hoverings, inferences, signs, or any other such physical interactions with one or more sensors, or any combination thereof, including vocal commands or interpretations of eye movements based on retinal tracking. Those with skill in the art will recognize that the methods, systems, and media described for supporting and interpreting gestures to select and save content may be used for a variety of storage providers/services and types of content, files, portions of files, and/or other types of data.

The present invention may take form in various components and arrangements of components, and in various techniques, methods, or procedures and arrangements of steps. The referenced drawings are only for the purpose of illustrating embodiments, and are not to be construed as limiting the present invention. Various inventive features are described below that can each be used independently of one another or in combination with other features.

FIG. 1 is an exemplary system for providing heuristics to select and save content to a synced online content management system in accordance with various embodiments. Elements in FIG. 1, including, but not limited to, first client electronic device 102a, second client electronic device 102b, and content management system 100 may communicate by sending and/or receiving data over network 106. Network 106 may be any network, combination of networks, or network devices that may carry data communication. For example, network 106 may be any one or any combination of LAN (local area network), WAN (wide area network), telephone network, wireless network, point-to point network, star network, token ring network, hub network, or any other configuration.

Network 106 may support any number of protocols, including but not limited to TCP/IP (Transfer Control Protocol and Internet Protocol), HTTP (Hypertext Transfer Protocol), WAP (wireless application protocol), etc. For example, first client electronic device 102a and second client electronic device 102b (collectively 102) may communicate with content management system 100 using TCP/IP, and, at a higher level, use browser 116 to communicate with a web server (not shown) at content management system 100 using HTTP. Examples of implementations of browser 116, include, but are not limited to, Google Inc. Chrome™ browser, Microsoft Internet Explorer®, Apple Safari®, Mozilla Firefox, and Opera Software Opera.

A variety of client electronic devices 102 may communicate with content management system 100, including, but not limited to, desktop computers, mobile computers, mobile communication devices (e.g., mobile phones, smart phones, tablets), televisions, set-top boxes, and/or any other network enabled device. Although two client electronic devices 102a and 102b are illustrated for description purposes, those with skill in the art will recognize that any number of devices may be used and supported by content management system 100. Client electronic devices 102 may be used to create, access, modify, and manage files 110a and 110b (collectively 110) (e.g. files, file segments, images, etc.) stored locally within file system 108a and 108b (collectively 108) on client electronic device 102 and/or stored remotely with content management system 100 (e.g., within data store 118). For example, client electronic device 102a may access file 110b stored remotely with data store 118 of content management system 100 and may or may not store file 110b locally within file system 108a on client electronic device 102a. Continuing with the example, client electronic device 102a may temporarily store file 110b within a cache (not shown) locally within client electronic device 102a, make revisions to file 110b, and the revisions to file 110b may be communicated and stored in data store 118 of content management system 100. Optionally, a local copy of the file 110a may be stored on client electronic device 102a.

Client devices 102 may capture, record, and/or store content items, such as image files 110. Client devices 102 may have a camera 138 (e.g., 138a and 138b) to capture and record digital images and/or videos. For example, camera 138 may capture and record images and store metadata with the images. Metadata may include, but is not limited to, the following: creation time timestamp, geolocation, orientation, rotation, title, and/or any other attributes or data relevant to the captured image.

Metadata values may be stored as attribute 112 name-value pairs, tag-value pairs, and/or any other method to associate the metadata with the file and easily identify the type of metadata. In some embodiments, attributes 112 may be tag-value pairs defined by a particular standard, including, but not limited to, Exchangeable Image File Format (Exif), JPEG File Interchange Format (Jfif), and/or any other standard.

A time normalization module 146 (e.g., 146a and 146b) may be used to normalize dates and times stored with a content item. An example of time normalization is provided in U.S. patent application Ser. No. 13/888,118, entitled "Date and Time Handling," filed on May 6, 2013, which claims the benefit of U.S. Provisional Patent Application No. 61/801,318, entitled "Date and Time Handling," filed on Mar. 15, 2013, both of which are incorporated herein by reference in their entirety. The time normalization module 146, counterpart time normalization module 148, and/or any combination thereof may be used to normalize dates and times stored for content items. The normalized times and dates may be used to sort, group, perform comparisons, perform basic math, and/or cluster content items.

An organization module 136 (e.g., 136a and 136b) may be used to organize content items (e.g., image files) into clusters, organize content items to provide samplings of content items for display within user interfaces, and/or retrieve organized content items for presentation. An example of organization is described in U.S. patent application Ser. No. 13/888,186, entitled "Presentation and Organization of Content," filed on May 6, 2013, which claims the benefit of U.S. Provisional Patent Application No. 61/794,184, entitled "Presentation and Organization of Content," filed on Mar. 15, 2013, both of which are incorporated herein by reference in their entirety.

The organization module 136 may utilize any clustering algorithm. The organization module 136 may be used to identify similar images for clusters in order to organize content items for presentation within user interfaces on devices 102 and content management system 100. Similarity rules may be defined to create one or more numeric representations embodying information on similarities between each of the content items in accordance with the similarity rules. The organization module 136 may use the numeric representation as a reference for similarity between content items in order to cluster the content items.

In some embodiments, content items may be organized into clusters to aid with retrieval of similar content items in response to search requests. For example, organization module 136a may identify that first and second images are similar and may be group the images together in a cluster. Organization module 136a may process image files to determine clusters independently or in conjunction with counterpart organization module (e.g., 140 and/or 136b). In other embodiments, organization module 136a may only provide clusters identified with counterpart organization modules (e.g., 140 and/or 136b) for presentation. Continuing with the example, processing of image files to determine clusters may be an iterative process that is executed upon receipt of new content items and/or new similarity rules.

In some embodiments, a search module 142 on client device 102 is provided with counterpart search module 144 on content management system 144 to support search for content items. A search request may be received by search module 142 and/or 144 that requests a content item. In some embodiments, the search may be handled by searching metadata and/or attributes assigned to content items during the provision of management services. For example, cluster markers stored with images may be used to find images by date. In particular, cluster markers may indicate an approximate time or average time for the images stored with the cluster marker in some embodiments, and the marker may be used to speed the search and/or return the search results with the contents of the cluster with particular cluster markers.

Files 110 managed by content management system 100 may be stored locally within file system 108 of respective devices 102 and/or stored remotely within data store 118 of content management system 100 (e.g., files 134 in data store 118). Content management system 100 may provide synchronization of files managed by content management system 100. Attributes 112a and 112b (collectively 112) or other metadata may be stored with files 110. For example, a particular attribute may be stored with the file to track files locally stored on client devices 102 that are managed and/or synchronized by content management system 100. In some embodiments, attributes 112 may be implemented using extended attributes, resource forks, or any other implementation that allows for storing metadata with a file that is not interpreted by a file system. In particular, an attribute 112a and 112b may be a content identifier for a file. For example, the content identifier may be a unique or nearly unique identifier (e.g., number or string) that identifies the file.

By storing a content identifier with the file, a file may be tracked. For example, if a user moves the file to another location within the file system 108 hierarchy and/or modifies the file, then the file may still be identified within the local file system 108 of a client device 102. Any changes or modifications to the file identified with the content identifier may be uploaded or provided for synchronization and/or version control services provided by the content management system 100.

A stand-alone content management application 114a and 114b (collectively 114), client application, and/or third-party application may be implemented to provide a user interface for a user to interact with content management system 100. Content management application 114 may expose the functionality provided with content management interface 104 and accessible modules for device 102. Web browser 116a and 116b (collectively 116) may be used to display a web page front end for a client application that may provide content management 100 functionality exposed/provided with content management interface 104.

Content management system 100 may allow a user with an authenticated account to store content, as well as perform management tasks, such as retrieve, modify, browse, synchronize, and/or share content with other accounts. Various embodiments of content management system 100 may have elements, including, but not limited to, content management interface module 104, account management module 120, synchronization module 122, collections module 124, sharing module 126, file system abstraction 128, data store 118, and organization module 140. The content management service interface module 104 may expose the server-side or back end functionality/capabilities of content management system 100. For example, a counter-part user interface (e.g., stand-alone application, client application, etc.) on client electronic devices 102 may be implemented using content management service interface 104 to allow a user to perform functions offered by modules of content management system 100. In particular, content management system 100 may have an organization module 140 for identifying similar content items for clusters and samples of content items for presentation within user interfaces.

The user interface offered on client electronic device 102 may be used to create an account for a user and authenticate a user to use an account using account management module 120. The account management module 120 of the content management service may provide the functionality for authenticating use of an account by a user and/or a client electronic device 102 with username/password, device identifiers, and/or any other authentication method. Account information 130 may be maintained in data store 118 for accounts. Account information may include, but is not limited to, personal information (e.g., an email address or username), account management information (e.g., account type, such as "free" or "paid"), usage information, (e.g., file edit history), maximum storage space authorized, storage space used, content storage locations, security settings, personal configuration settings, content sharing data, etc. An amount of content management may be reserved, allotted, allocated, stored, and/or may be accessed with an authenticated account. The account may be used to access files 110 within data store 118 for the account and/or files 110 made accessible to the account that are shared from another account. Account module 120 may interact with any number of other modules of content management system 100.

An account may be used to store content, such as documents, text files, audio files, video files, etc., from one or more client devices 102 authorized on the account. The content may also include folders of various types with different behaviors, or other mechanisms of grouping content items together. For example, an account may include a public folder that is accessible to any user. The public folder may be assigned a web-accessible address. A link to the web-accessible address may be used to access the contents of the public folder. In another example, an account may include a photos folder that is intended for photos and that provides specific attributes and actions tailored for photos; an audio folder that provides the ability to play back audio files and perform other audio related actions; or other special purpose folders. An account may also include shared folders or group folders that are linked with and available to multiple user accounts. The permissions for multiple users may be different for a shared folder.

Content items (e.g., files 110) may be stored in data store 118. Data store 118 may be a storage device, multiple storage devices, or a server. Alternatively, data store 118 may be cloud storage provider or network storage accessible via one or more communications networks. Content management system 100 may hide the complexity and details from client devices 102 by using a file system abstraction 128 (e.g., a file system database abstraction layer) so that client devices 102 do not need to know exactly where the content items are being stored by the content management system 100. Embodiments may store the content items in the same folder hierarchy as they appear on client device 102. Alternatively, content management system 100 may store the content items in various orders, arrangements, and/or hierarchies. Content management system 100 may store the content items in a network accessible storage (SAN) device, in a redundant array of inexpensive disks (RAID), etc. Content management system 100 may store content items using one or more partition types, such as FAT, FAT32, NTFS, EXT2, EXT3, EXT4, ReiserFS, BTRFS, and so forth.

Data store 118 may also store metadata describing content items, content item types, and the relationship of content items to various accounts, folders, collections, or groups. The metadata for a content item may be stored as part of the content item and/or may be stored separately. Metadata may be store in an object-oriented database, a relational database, a file system, or any other collection of data. In one variation, each content item stored in data store 118 may be assigned a system-wide unique identifier.

Data store 118 may decrease the amount of storage space required by identifying duplicate files or duplicate chunks of files. Instead of storing multiple copies, data store 118 may store a single copy of a file 134 and then use a pointer or other mechanism to link the duplicates to the single copy. Similarly, data store 118 may store files 134 more efficiently, as well as provide the ability to undo operations, by using a file version control that tracks changes to files, different versions of files (including diverging version trees), and a change history. The change history may include a set of changes that, when applied to the original file version, produce the changed file version.

Content management system 100 may be configured to support automatic synchronization of content from one or more client devices 102. The synchronization may be platform independent. That is, the content may be synchronized across multiple client devices 102 of varying type, capabilities, operating systems, etc. For example, client device 102a may include client software, which synchronizes, via a synchronization module 122 at content management system 100, content in client device 102 file system 108 with the content in an associated user account. In some cases, the client software may synchronize any changes to content in a designated folder and its sub-folders, such as new, deleted, modified, copied, or moved files or folders. In one example of client software that integrates with an existing content management application, a user may manipulate content directly in a local folder, while a background process monitors the local folder for changes and synchronizes those changes to content management system 100. In some embodiments, a background process may identify content that has been updated at content management system 100 and synchronize those changes to the local folder. The client software may provide notifications of synchronization operations, and may provide indications of content statuses directly within the content management application. Sometimes client device 102 may not have a network connection available. In this scenario, the client software may monitor the linked folder for file changes and queue those changes for later synchronization to content management system 100 when a network connection is available. Similarly, a user may manually stop or pause synchronization with content management system 100.

A user may also view or manipulate content via a web interface generated and served by user interface module 104. For example, the user may navigate in a web browser to a web address provided by content management system 100. Changes or updates to content in the data store 118 made through the web interface, such as uploading a new version of a file, may be propagated back to other client devices 102 associated with the user's account. For example, multiple client devices 102, each with their own client software, may be associated with a single account and files in the account may be synchronized between each of the multiple client devices 102.

Content management system 100 may include sharing module 126 for managing sharing content and/or collections of content publicly or privately. Sharing module 126 may manage sharing independently or in conjunction with counterpart sharing module (e.g., 152a and 152b). Sharing content publicly may include making the content item and/or the collection accessible from any computing device in network communication with content management system 100. Sharing content privately may include linking a content item and/or a collection in data store 118 with two or more user accounts so that each user account has access to the content item. The sharing may be performed in a platform independent manner. That is, the content may be shared across multiple client devices 102 of varying type, capabilities, operating systems, etc. The content may also be shared across varying types of user accounts. In particular, the sharing module 126 may be used with the collections module 124 to allow sharing of a virtual collection with another user or user account. A virtual collection may be a grouping of content identifiers that may be stored in various locations within file system of client device 102 and/or stored remotely at content management system 100.

The virtual collection for an account with a file storage service is a grouping of one or more identifiers for content items (e.g., identifying content items in storage). An example of virtual collections is provided in U.S. Provisional Patent Application No. 61/750,791, entitled "Presenting Content Items in a Collections View," filed on Jan. 9, 2013, and herein incorporated by reference in its entirety. The virtual collection is created with the collection module 124 by selecting from existing content items stored and/or managed by the file storage service and associating the existing content items within data storage (e.g., associating storage locations, content identifiers, or addresses of stored content items) with the virtual collection. By associating existing content items with the virtual collection, a content item may be designated as part of the virtual collection without having to store (e.g., copy and paste the content item file to a directory) the content item in another location within data storage in order to place the content item in the collection.

In some embodiments, content management system 100 may be configured to maintain a content directory or a database table/entity for content items where each entry or row identifies the location of each content item in data store 118. In some embodiments, a unique or a nearly unique content identifier may be stored for each content item stored in the data store 118.

Metadata may be stored for each content item. For example, metadata may include a content path that may be used to identify the content item. The content path may include the name of the content item and a folder hierarchy associated with the content item (e.g., the path for storage locally within a client device 102). In another example, the content path may include a folder or path of folders in which the content item is placed as well as the name of the content item. Content management system 100 may use the content path to present the content items in the appropriate folder hierarchy in a user interface with a traditional hierarchy view. A content pointer that identifies the location of the content item in data store 118 may also be stored with the content identifier. For example, the content pointer may include the exact storage address of the content item in memory. In some embodiments, the content pointer may point to multiple locations, each of which contains a portion of the content item.

In addition to a content path and content pointer, a content item entry/database table row in a content item database entity may also include a user account identifier that identifies the user account that has access to the content item. In some embodiments, multiple user account identifiers may be associated with a single content entry indicating that the content item has shared access by the multiple user accounts.

To share a content item privately, sharing module 126 may be configured to add a user account identifier to the content entry or database table row associated with the content item, thus granting the added user account access to the content item. Sharing module 126 may also be configured to remove user account identifiers from a content entry or database table rows to restrict a user account's access to the content item. The sharing module 126 may also be used to add and remove user account identifiers to a database table for virtual collections.

To share content publicly, sharing module 126 may be configured to generate a custom network address, such as a uniform resource locator (URL), which allows any web browser to access the content in content management system 100 without any authentication. To accomplish this, sharing module 126 may be configured to include content identification data in the generated URL, which may later be used to properly identify and return the requested content item. For example, sharing module 126 may be configured to include the user account identifier and the content path in the generated URL. Upon selection of the URL, the content identification data included in the URL may be transmitted to content management system 100 which may use the received content identification data to identify the appropriate content entry and return the content item associated with the content entry.

To share a virtual collection publicly, sharing module 126 may be configured to generate a custom network address, such as a uniform resource locator (URL), which allows any web browser to access the content in content management system 100 without any authentication. To accomplish this, sharing module 126 may be configured to include collection identification data in the generated URL, which may later be used to properly identify and return the requested content item. For example, sharing module 126 may be configured to include the user account identifier and the collection identifier in the generated URL. Upon selection of the URL, the content identification data included in the URL may be transmitted to content management system 100 which may use the received content identification data to identify the appropriate content entry or database row and return the content item associated with the content entry or database TOW.

In addition to generating the URL, sharing module 126 may also be configured to record that a URL to the content item has been created. In some embodiments, the content entry associated with a content item may include a URL flag indicating whether a URL to the content item has been created. For example, the URL flag may be a Boolean value initially set to 0 or false to indicate that a URL to the content item has not been created. Sharing module 126 may be configured to change the value of the flag to 1 or true after generating a URL to the content item.

In some embodiments, sharing module 126 may also be configured to deactivate a generated URL. For example, each content entry may also include a URL active flag indicating whether the content should be returned in response to a request from the generated URL. For example, sharing module 126 may be configured to only return a content item requested by a generated link if the URL active flag is set to 1 or true. Changing the value of the URL active flag or Boolean value may easily restrict access to a content item or a collection for which a URL has been generated. This allows a user to restrict access to the shared content item without having to move the content item or delete the generated URL. Likewise, sharing module 126 may reactivate the URL by again changing the value of the URL active flag to 1 or true. A user may thus easily restore access to the content item without the need to generate a new URL.

Figure 2:
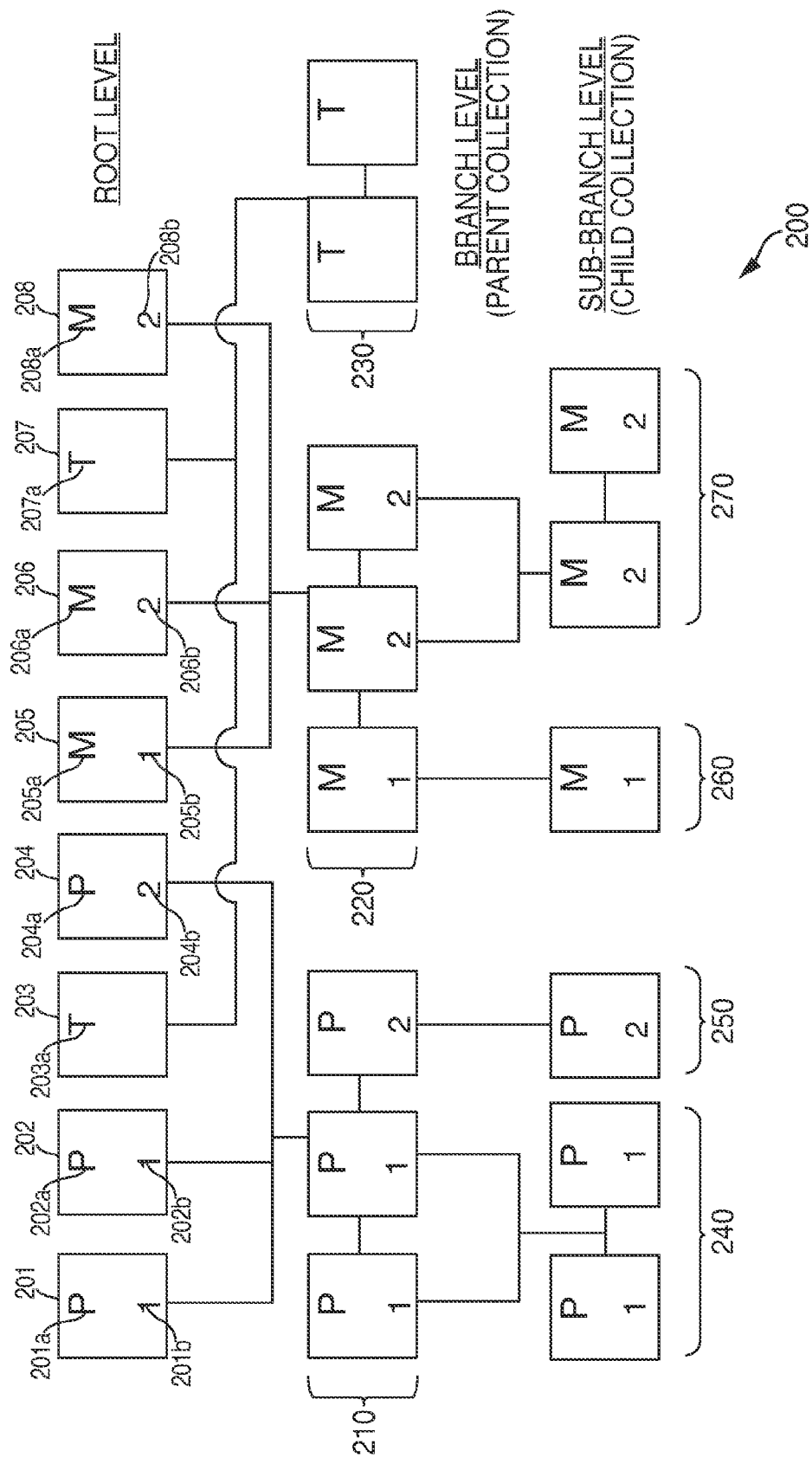
FIG. 2 is a schematic illustration of a file hierarchy in accordance with various embodiments.

FIG. 2 is a schematic illustration of a file hierarchy in accordance with various embodiments. File hierarchy 200 may include content items 201-208. Content items 201-208 each may include one or more attributes. An attribute may be any identification tag, keyword, and/or metadata that may describe a content item's type, source, history, or any other relevant information, or any combination thereof. In some embodiments, content items 201-208 may each include a type indicator and a source indicator. For example, content items 201, 202, and 204 may include type indicators 201a, 202a, and 204a, respectively. In some embodiments, type indicators 201a, 202a, and 204a may each correspond to a same type of content item. For example, content item 201 may be a picture having the letter "P" as type indicator 201a. Content items 202 and 204 may also be pictures and therefore may also have the letter "P" as type indicators 202a and 204a. As another example, content items 205, 206, and 208 may be music files having the letter "M" as type indicators 205a, 206a, and 208a. As yet another example, content items 203 and 207 may be text documents having the letter "T" as type indicators 203a and 207a. The use of three pictures, three music files, and two text documents as types and amounts of content items is merely exemplary and any content type and/or amount may be used.

Content items 201-208 may also include a second attribute. In some embodiments, the second attribute may be a source identifier, a timestamp, or any type of data flag or data identification, or any combination thereof. In some embodiments, content items 201, 202, and 205 may have each been obtained from a same source, and source indicators 201b, 202b, and 205b may signify that content items 201, 202 and 205 have the same source identifier. For example, content items 201, 202, and 205 may have each been obtained from a first source and have the number "1" as source identifiers 201b, 202b, and 205b. In some embodiments, content items 204, 206, and 208 may have been obtained from a same source, and thus their respective source indicators 204b, 206b, and 208b may signify the same source identifier. As another example, content items 204, 206, and 208 may have been obtained from a second source and have the number "2" as source identifiers 204b, 206b, and 208b. Any number of attributes may be associated with a content item, and the use of a type identifier and a source identifier are merely exemplary. In some embodiments, content items 203 and 207 may not have been obtained from any particular source, or may not include any source information and thus may not have a source identifier. In some embodiments, one or more of content items 201-208 may correspond to an index or multiple indices to content items. For example, a content item may be an index to a content item that may not actually be stored on the device, or, for example, a truncated version of the actual content item, such as a thumbnail of a photograph stored in remote storage. As still another example, a content item may include a URL or a pointer to a content item. File hierarchy 200 may have content items 201-208 included at the root level. At the root level, all files included in the file hierarchy may be displayed/presented. Although all of content items 201-208 are presented at the root level of file hierarchy 200, as the number of content items grows, the ability to find and/or select one or more of the content items may become increasingly difficult. A user may organize file hierarchy 200 in such a manner as to allow content items with similar attributes to be grouped together. This may ease the process of finding a particular content item because the content item may be located in a particular location with fewer content items than at the root level.

In some embodiments, file hierarchy 200 may be organized from the root level by the type indicator associated with each content item. In some embodiments, the level "above" the root level may be referred to as a branch level, a parent directory, and/or a parent collection, and the use of one term does not preclude the use of another. In some embodiments, content items with similar type indicators may be organized into various branches at the first branch level. For example, the branch level may include branches 210, 220, and 230. Branches 210, 220, and 230 may each include content items derived from the root level but grouped according to similar attributes, such as type indicator. For example, first branch 210 may include content items 201, 202, and 204. Content items 201, 202, and 204 each may have type indicator "P" signifying photographs, thus branch 210 may be a grouping of photographs. Second branch 220 may include content items 205, 206, and 208 which may have type indicators "M" signifying music files. Third group 230 may include content items 203 and 207 having type indicator "T" signifying textual documents, and thus third branch 230 may be a grouping textual documents.

Each of branches 210, 220, and 230 include content items that may be initially stored/placed at the root level, or reside at both the root level and the branch level. For example, duplicate versions of content items may be created when a content item is moved from one branch to another, and/or from branch to the root level. As another example, a pointer to the file or an index of content items may be moved to a branch as opposed to a duplicate content item The content items included in the various branches may each have the same attributes they initially had at the root level, and therefore any additional grouping of content items may occur either from the branch level, or via an additional branch. In some embodiments, the next level grouping "above" the branch level may be referred to as the sub-branch level. The sub-branch level may also be referred to as the child collection or the child directory. Thus, in order to trace a file back to the parent directory or branch level, the user must follow the correct path back to the correct parent. Additional layers of the groups may occur that may be referred to as sub-sub-branch levels or grandchild levels, and further branch levels may be referred to as sub-sub-sub-branch levels or great-grandchild levels.

In some embodiments, first branch 210 may include a grouping of content items that have type indicator "P", although content items 201, 202, and 204 may have different source indicators. Source indicators 201b and 202b, which correspond to content items 201 and 202, may correspond to a first source labeled by "1". Source indictor 204b, corresponding to content item 204 may correspond to a second source labeled by "2". Because content items 201, 202, and 204 all have similar type indicators 201a, 202a, and 204a, these content items may be grouped together at the branch level in first branch 210. However, sub-branches 240 and 250 may be included within first branch 210 and may be organized by source indicators.

First sub-branch 240 may include content items 201 and 202, which both may have type indicator "P" and source indicator "1". Second sub-branch 250 may include content item 204 which has the same type indicator "P" as content items 201 and 202, but may have source indicator "2".

In some embodiments, second branch 220 may include a grouping of content items having type indicator "M", but one or more different source indicators. For example, content items 206 and 208 may have source indicators 206b and 208b signifying second source "2" whereas content item 205 may have source indicator 205b corresponding to the first source "1".

In some embodiments, second branch 220 may include sub-branches 260 and 270. For example, third sub-branch 260 may correspond to a first sub-branch of second branch 220. Third sub-branch 260 may include content item 205, whereas fourth sub-group 270 may include content items 206 and 208. Each of content items 205, 206, and 208 have same type indicator (e.g., "M" signifying music files), however source indicator 205b may differ from source indicators 206b and 208b. Third sub-branch 260 thus may include content item 205 having type indicator "M" and source indicator "1", whereas fourth sub-branch 270 may include content items 206 and 208, each having type indicator "M" and source indicator "2".

In some embodiments, third branch 230 may correspond to content items having type indicator "T". Branch 230 may include content items 203 and 207 that may, in some embodiments, not include a source indicator. Thus, unless additional information is attributed to content items 203 and 207, further grouping of these two content items may not be possible.

It should be noted that the grouping of content item items presented with file hierarchy 200 is merely exemplary and any grouping may be used. For example, instead of grouping at the branch level by type indicator, one could group at the branch level by source indicator or any other attribute associated with content items 201-208. Grouping at the branch level by type indicator and at a sub-branch level by source indicator is merely one possible grouping option, and thus it should not be construed as a limitation.

Figure 3:
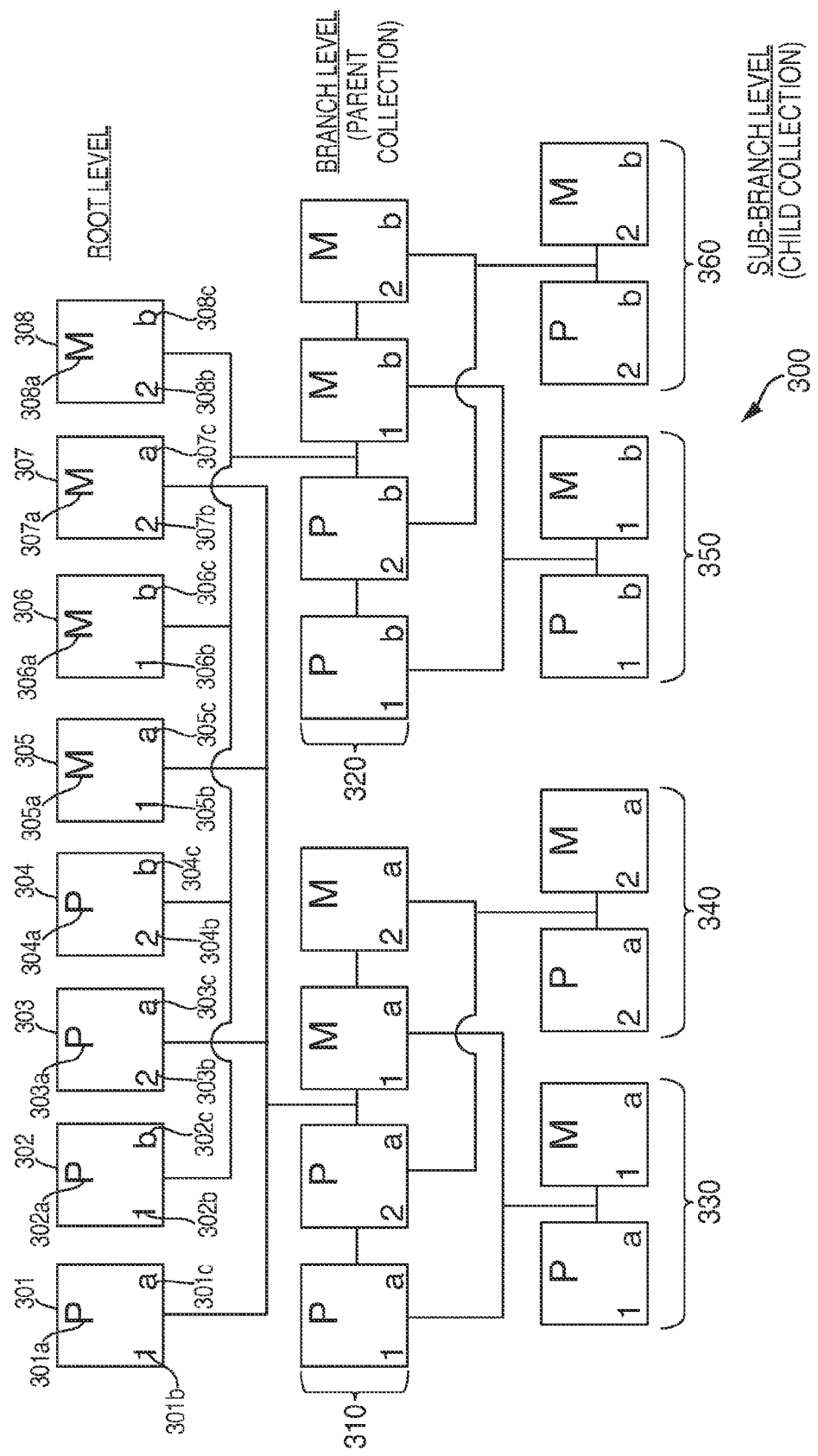
FIG. 3 is a schematic illustration of a file hierarchy in accordance with various embodiments.

FIG. 3 is a schematic illustration of a file hierarchy in accordance with various embodiments. File hierarchy 300 may include content items 301-308 arranged in an exemplary hierarchal manner. Content items 301-308 may be substantially similar to content items 201-208 of FIG. 2 with the exception that each content item may include a type indicator, a source indicator, and a share indicator. Although three attributes are included with each of content items 301-308, any number of attributes and/or types of attributes may be included with each content item and the use of a type indicator, source indicator, and share indicator is merely exemplary. In some embodiments, one or more of content items 301-308 may correspond to an index or indices to content items, as noted above. Content items 301-308 may be presented at a root level of file hierarchy 300. At the root level, each content item may be presented on its own, and not necessarily within, associated with, or linked to, any folder, directory, and/or collection. Content items 301-304 may each have the letter "P" as type indicators 301a-304a. A content item having the letter "P" may, in some embodiments, correspond to a photo. Content items 305-308 may each have the letter "M" as type indicators 305a-308a. A content item having the letter "M" may, in some embodiments, correspond to a music file. It should be noted that although only eight content items and two content item types are presented, any number of content items and any number of content item types may be used.

In some embodiments, each content item may include a source indicator. Content items 301, 302, 305, and 306 may have source indicators 301a, 302a, 305a, and 306a, respectively, corresponding to first source "1". A content item including the number "1" as its source indicator may correspond to a content item from the first source. Content items 303, 304, 307, and 308 may have source indicators 303a, 304a, 307a, and 308a, respectively, corresponding to second source "2". A content item including the number "2" as its source indicator may correspond to a content item from the second source.

In some embodiments, each content item may include a share indicator. A share indicator may be any attribute that notes whether or not a content item has been shared. For example, a content item including the letter "a" may correspond to a content item that has previously been shared, whereas a content item including the letter "b" may correspond to a content item that has not yet been shared. As seen at the root level of file hierarchy 300, content items 301, 303, 305, and 307 may each include share indicators 301c, 303c, 305c, and 307c having the letter "a" as their share indicator. Content items 302, 304, 306, and 308 may each include share indicators 302c, 304c, 306c, and 308c having the letter "b" as their share indicator. As noted above, the use of a share indicator, two states for the share indicator, and the letters "a" and "b" are merely exemplary. Any other attribute may be attributed to content items 301-308 and/or any other state, letter, and/or symbol may be used to describe the sharing status of each content item, and the aforementioned are merely exemplary.

In some embodiments, content items may be grouped at the branch level by share indicators. For example, the branch level may include branches 310 and 320. In some embodiments, first branch 310 may include content items having the letter "a" and second branch 320 may include content items having the letter "b" as share indicators. For example, the content items included in first branch 310 may be content items that have previously been shared, whereas the content items included in second branch 320 may be content items that have not yet been shared.

In some embodiments, first branch 310 may include content items 301, 303, 305, and 307, and second branch 320 may include content items 302, 304, 306, and 308. Each of branches 310 and 320 may include content items having different type indicators and/or different source indicators. For example, within first branch 310 may be content items 301 and 305. Content item 301 may have type indicator "P" and source indicator "1". Content item 305 may have type indicator "M" and source indicator "2". First branch 310, therefore, may include a variety of content items having various different attributes while all including at least one similar attribute, which may form the basis for the grouping of branch 310. As another example, second branch 320 may include content items 302 and 308, which may have type indicators "P" and "M", respectively, and source indicators "1" and "2", respectively. Branch 320, therefore, may include a variety of content items having various different attributes while all including same share indicator "b".

In some embodiments, content items grouped at the branch level may further be grouped at the sub-branch level. For example, the sub-branch level may include sub-branches 330, 340, 350, and 360. In some embodiments, sub-branches 330 and 340 may be groupings of content items included in first branch 310. First sub-branch 330, for example, may include content items 301 and 305. Sub-branch 330, which may have initially been derived from first branch 310, may be a grouping of content items that include both the same share indicator and the same source indicator. For example, content items 301 and 305 each may have share indicator "a" and source indicator "1". Thus, although content items 301 and 305 may have different type indicators (e.g., P and M respectively), they may be grouped together by their other attributes. Second sub-branch 340, for example, may include content items 303 and 307. Sub-branch 340, which also may have initially been derived second branch 320, may be a grouping of content items that may include both the same share indicator and the same source indicator. For example, content items 303 and 307, which each have share indicator "a", may also both have source indicator "2".

In some embodiments, sub-branches 350 and 360 may each have been derived from second branch 320. As previously discussed, the content items included within branch 320 may each have share indicator "b". For example, third sub-group 350 may include content items 302 and 306, each having share indicator "b" and source indicator "1". Thus, although content items 302 and 306 may have different type indicators (e.g., P and M, respectively), they may be grouped together by their other like attributes (e.g., source indicator and share indicator). Similarly, fourth sub-group 360, which may include content items 304 and 308, each have share indicator "b" and source indicator "2", but may have different type indicators.

Organization of file hierarchy 300 from the root level to the branch level and then to the sub-branch level is merely one possible structure for organizing a file hierarchy. An example of organization is described in U.S. patent application Ser. No. 13/888,186, entitled "Presentation and Organization of Content," filed on May 6, 2013, which is hereby incorporated herein by reference in its entirety. File tree hierarchy 300 is merely a visual depiction of one exemplary way to group content items. In some embodiments, a user may use one or more gestures to navigate or move from one branch to another branch, between one branch and one sub-branch, and/or between one sub-branch and another sub-branch. Navigating or moving between branches using gestures may be substantially similar to a back-end process using command line prompts in a terminal window. For example, users operating at the command line in a terminal window may initially be at the root level. For example, the user may view all the content items at the root level by entering any suitable command (e.g., list).

The following discussion illustrates various standard command line prompts that gestures may be mapped to, in navigating through an exemplary file hierarchy.

Table 1.0 illustrates exemplary command line prompts that gestures may be mapped to according to various illustrative embodiments. For example, to arrive at first sub-group 330, a user may provide a gesture which may have a substantially similar effect to that of the user typing, at a conventional command line, the prompt:

cd/User/share_indicator_a/source_indicator_2/.

Providing the gesture or typing the above command may change the current branch or directory, and present the user with content items 303 and 307. Similarly, providing a different gesture or having the user type the command line prompt:

cd/User/share_indicator_b/source_indicator_1/ into a terminal window, may change the current branch or directory, and may present content items 302 and 306 to the user, included within third sub-branch 350. Although file hierarchy 300 may show organization of content items at the branch level by share indicator and at the sub-branch level by source indicator, it should be understood that content items may be grouped in any suitable manner at both the branch and sub-branch level.

TABLE 1.0

| Branch | Exemplary Command Line Prompt |
| --- | --- |
| First Branch 310 | cd/ User/share_indicator_a/ |
| Second Branch 320 | cd/ User/share_indicator_b/ |
| First Sub-Branch 330 | cd/ User/share_indicator_a/source_indicator_1/ |
| Second Sub-Branch 340 | cd/ User/share_indicator_a/source_indicator_2/ |
| Third Sub-Branch 350 | cd/ User/share_indicator_b/source_indicator_1/ |
| Fourth Sub-Branch 360 | cd/ User/share_indicator_b/source_indicator_2/ |

Figure 4:
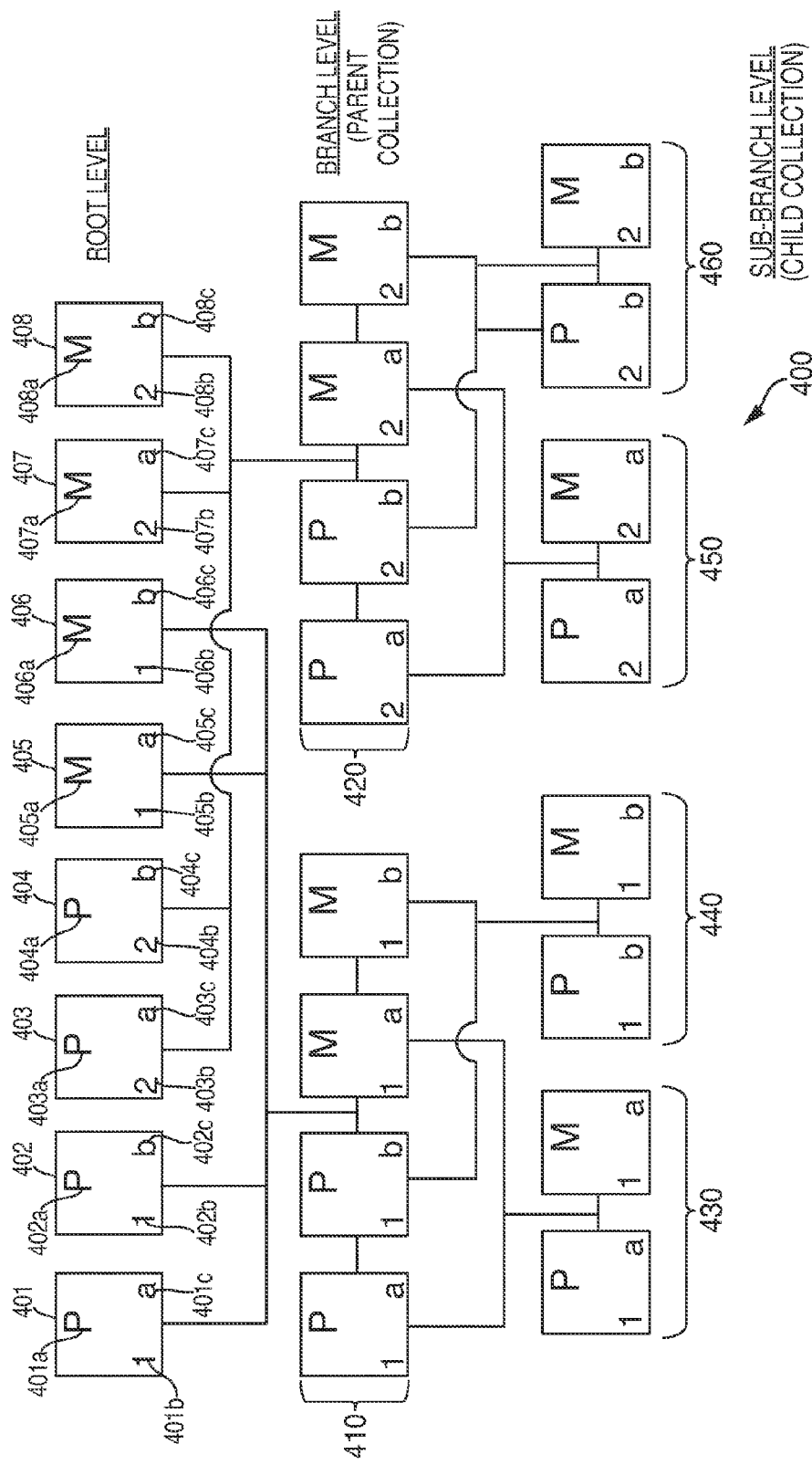
FIG. 4 is a schematic illustration of a file hierarchy in accordance with various embodiments.

FIG. 4 is a schematic illustration of a file hierarchy in accordance with various embodiments. File hierarchy 400 may include content items 401-408. Content items 401-408 may be substantially similar to content items 301-308 of FIG. 3, and the previous description of the latter may apply to the former. Furthermore, each content item of content items 401-408 may also have a corresponding type indicator, source indicator, and share indicator. For example, content item 401 may have type indicator "P", source indicator "1", and share indicator "a", whereas content item 408 may have type indicator "M", source indicator "2", and type indicator "b".

In some embodiments, content items having type indicator "P" may correspond to photos whereas content items having type indicator "M" may correspond to music files. However, this is merely exemplary and any attribute may be used to describe the content item's type. In some embodiments, content items having source indicator "1" may correspond to a first source whereas content items having source indicator "2" may correspond to a second source. Any number of sources may be used, and the use of a first source and a second source is merely exemplary. In some embodiments, content items having share indicator "a" may correspond to a content item that has been shared whereas content items having share indicator "b" may correspond to a content item that has not (yet) been shared. Content item 401 may, in some embodiments, be substantially similar to content item 301, and the previous description of the latter may apply to the former. Additionally, each of content items 402-408 may also be substantially similar to corresponding content items 302-308 of FIG. 3, and the previous descriptions of the latter may apply to the former.

In some embodiments, content items may be grouped at the branch level by source indicator. For example, the branch level of file hierarchy 400 may include branches 410 and 420. First branch 410 may include content items 401, 402, 405, and 406, and second branch 420 may include content items 403, 404, 407, and 408. Content items included in first branch 410 may each have the same source indicator "1", whereas content items included in second branch 420 may each have the same source indicator "2". Thus, in some embodiments, although branches 410 and 420 may each have the same amount of content items and the same amount of content item types as branches 310 and 320 of FIG. 3, the groupings may differ because the grouping of content items at the branch level may be performed based on different attributes. Thus, the ordering of content items into groups may be non-commutable.

In some embodiments, content items may be further grouped at the sub-branch level by share indicator. For example, sub-branch level of file hierarchy 400 may include sub-branch 430, 440, 450, and 460. In some embodiments, content items included within sub-branch 430 and 440 may have similar source indicators but different share indicators. For example, content items 401, 402, 405, and 406 may each have source indicator "1". However, content items 401 and 402 may have share indicator "a" whereas content items 405 and 406 may have share indicator "b". In some embodiments, sub-branches 450 and 460 may also include content items having similar source indicators, which may be different than sub-branches 430 and 440, as well as having different share indicators. For example, content items 403, 404, 407, and 408 each may have source indicator "2". However, content items 403 and 407 may have share indicator "a" whereas content items 404 and 408 may have share indicator "b".

In some embodiments, groups at the sub-branch level may have similar content items, but the path to reach a particular sub-group may differ depending on the organization at the branch level of the sub-branch groups. For example, sub-branches 340 and 450 may be substantially similar, however the path to reach either branch may be substantially different. Table 2.0 illustrates exemplary command line prompts that may correspond to gestures. For example, a user may type in a command line prompt to reach a specific branch, whereas a user-interface according to exemplary embodiments may allow the user to reach the same branch using one or more appropriate gestures.

TABLE 2.0

| Branch | Exemplary Command Line Prompt |
|---|---|
| First Branch 410 | cd/ User/source_indicator_1/ |
| Second Branch 420 | cd/ User/source_indicator_2/ |
| First Sub-Branch 430 | cd/ User/source_indicator_1/share_indicator_a/ |
| Second Sub-Branch 440 | cd/ User/source_indicator_1/share_indicator_b/ |
| Third Sub-Branch 450 | cd/ User/source_indicator_2/share_indicator_a/ |
| Fourth Sub-Branch 460 | cd/ User/source_indicator_2/share_indicator_b/ |

Figure 5A:
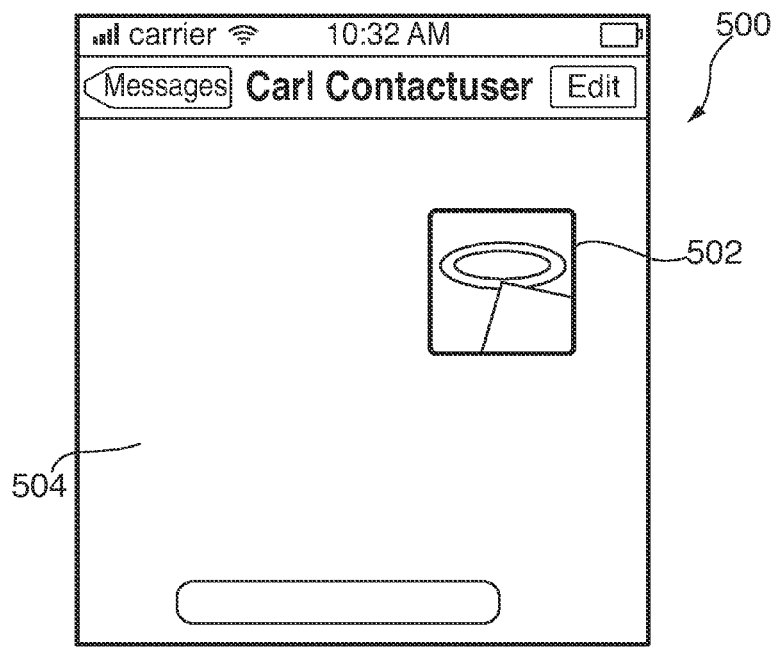
FIG. 5A is a schematic illustration of user interface displayed on a user device in accordance with various embodiments.

FIG. 5A is a schematic illustration of a user interface displayed on a user device in accordance with various embodiments. User interface 500 includes touch-sensing display interface 504 and, in some embodiments, the device corresponding to user interface 500 (e.g., a smartphone, tablet, etc.) may be running a content management system local client. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive gestures. Multi-touch panels, for example, may include capacitive sensing mediums having a plurality of row traces or driving line traces, and a plurality of column traces or sensing lines. Although multi-touch panels are described herein as one example for touch-sensing display interface, it should be understood that any touch-sensing display interface known to those skilled in the art may be used.

In some embodiments, content item 502 may be displayed on touch-sensing display interface 504. Various content items may include, but are not limited to, photographs, music files, video files, text documents, slide shows, spreadsheets, contact information, presentations, or any other type of file, or any combination thereof. In some embodiments, content item 502 may be obtained from, for example, a contact associated with the user device, a content management system, one or more social media networks, or any other appropriate source, or any combination thereof. For example, a user may receive a photograph via a text message from a contact associated with the device displaying user interface 500.

In some embodiments, a user may save and/or share content item 502 with one or more contacts. For example, a user may receive a photograph from a friend and may want to share the photograph with another contact, upload the photograph to a content management system, and/or share the photograph using a social media network. In some embodiments, a first gesture may be detected by the touch-sensing display interface to engage a mode that may perform an operation on the content item. For example, a user may press a finger on content item 502 which may be detected by touch-sensing display interface 504. In some embodiments, the user may contact touch-sensing display interface 504 with one or more fingers, a stylus, a computer compatible pen, or any other object capable of interfacing with the touch-sensing display interface. For example, a user may hover a finger or other object above the touch-sensing display interface, perform a gesture with a hand or body part, speak a vocal command, or perform a visual gesture (e.g., as may be detected and interpreted by a retinal scanning system). The aforementioned examples are merely exemplary, and any object or combination of objects may be detected by the touch-sensing display interface.

In some embodiments, the first gesture to engage the mode may perform an operation on the content item. An example of gestures and objects that may perform gestures are provided in U.S. patent application Ser. No. 13/965,734, entitled "Gestures for Selecting a Subset of Content Items," filed on Aug. 8, 2013, which is incorporated herein by reference in its entirety. In some embodiments, the first gesture may be a "long press," where a user contacts the touch-sensing display interface for a predefined period of time. For example, a user may touch content item 502 on touch-sensing display interface 504 for five (5) seconds to select the content item. The use of five (5) seconds is merely exemplary and any suitable amount of time may be used (e.g., 1 second, 2 seconds, 10 seconds, 30 seconds, etc.).

Figure 5B:
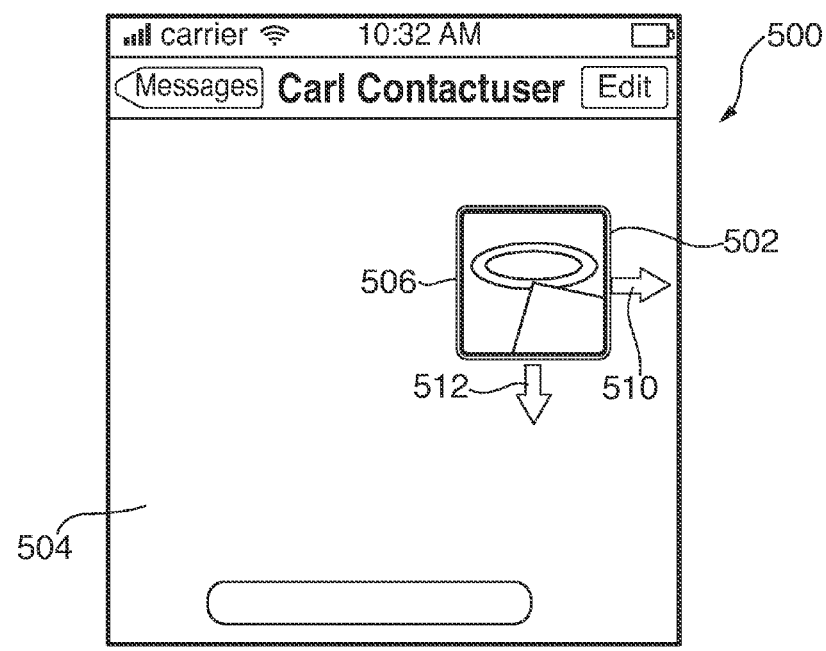
FIG. 5B is a schematic illustration of user interface displayed on a user device in accordance with various embodiments.

FIG. 5B is a schematic illustration of user interface displayed on a user device in accordance with various embodiments. In some embodiments, content item 502 may be modified in response to detecting the first gesture. In some embodiments, after detecting the first gesture the content item may include a visual indication that the mode has been engaged. For example, outline 506 may be included with content item 502 in response to detection of the long press. As another example, after detecting the first gesture, the content item may become enlarged, brighter, displayed on a separate screen, may "jiggle" or dance, or may be displayed with any other modification, or any combination thereof.

In some embodiments, the content item may be duplicated in response to detecting the first gesture. For example, after detecting the first gesture, content item 502 may be duplicated and stored in a temporary memory until further processed. In some embodiments, the original version of the content item may remain unaltered whereas a second gesture may be performed on the duplicate content item. For example, continuing the previous example where a user receives a photograph via a text message, the user may touch the photograph for five seconds. Touching the photograph for five seconds may select the photograph and generate a duplicate version of the photograph in a temporary memory or cache, but otherwise may not affect the original photograph contained within the SMS message.

In some embodiments, once the first gesture engages a selection mode for the content item, additional gestures may be detected by the touch-sensing display interface that may perform an action on the selected content item. In some embodiments, a user may select the content item and swipe in a first direction to upload the content item to a content management system. For example, a user may swipe content item 502 in the direction of arrow 510, which may automatically upload or save content item 502 and/or a duplicate version of content item 502 to a specific branch or collection of content items on a content management system (e.g., content management system 100). As another example, a user may swipe content item 502 in the direction of arrow 512, which may save content item 502 to the device displaying user interface 500. The use of a swipe is merely exemplary and any gesture may be detected by the touch-sensing display interface to perform an action on the content item. As mentioned above, an example of gestures and objects that may perform gestures are provided in U.S. patent application Ser. No. 13/965,734, entitled "Gestures for Selecting a Subset of Content Items," filed on Aug. 8, 2013, previously incorporated herein by reference in its entirety.

In some embodiments, uploading the content item to a content management system may automatically generate a duplicate version of the content item, which may then be uploaded instead of the original content item. This may be done for persistence purposes to ensure that the original content item remains within the first application while the duplicate may be delivered to the content management system. In some embodiments, the first application may include instructions received from a second application that indicate actions to be performed in response to detected commands. For example, content management system 100, may have corresponding content management application 114 resident on client electronic devices 102. Content management application 114 may include instructions that instruct one or more applications native to client electronic devices 102 to perform certain actions in response to certain commands. For example, content management application 114 may instruct a native messaging application that, in response to detecting a first gesture performed on a content item, to create a duplicate version of the content item. As another example, content management application 114 may instruct the native messaging application that, upon detecting a certain gesture and/or gestures, to open content management application 114. As still yet another example, content management application 114 may, in response to detecting one or more gestures, instruct the native messaging application to open content management application 114 and create a duplicate version of the selected content item or items that will be transmitted to content management application 114 and then to content management system 100.

In some embodiments, a user may select the content item and swipe in a first direction, which may display a file tree hierarchy within a second application, such as a content management system application. For example, a user may swipe content item 502 in the direction of arrow 510 causing the content item to be displayed on a new display window including a file hierarchy (e.g., file hierarchy 200 of FIG. 2). In some embodiments, the new display window including the file hierarchy may be a file tree associated with a content management system associated with the user of the device. By presenting the file tree on user interface 500, the user may organize the content item into various branches or collections on the file tree in a quick and efficient manner.

Figure 6A:
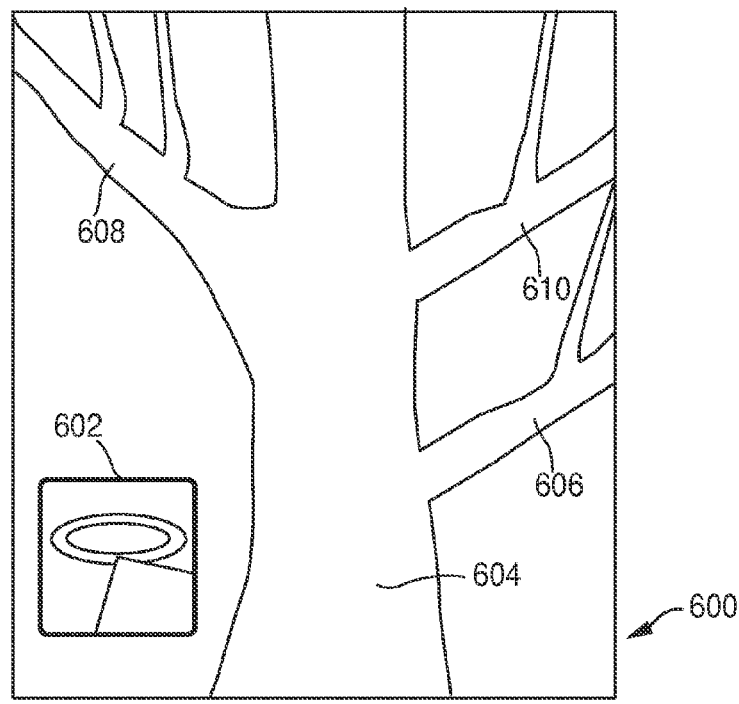
FIG. 6A is a schematic illustration of a file tree hierarchy displayed on a user device in accordance with various embodiments.

FIG. 6A is a schematic illustration of a file tree hierarchy displayed on a user device in accordance with various embodiments. File tree hierarchy 600 may include root 604 and branches 606, 608, and 610. In some embodiments, file tree hierarchy 600 may be displayed to the user in response to one or more gestures being performed. For example, swiping content item 502 of FIG. 5B in the direction of arrow 510 may display file tree hierarchy 600 to the user. In some embodiments, the user may perform any other suitable gesture to display file tree hierarchy 600. For example, a user may swipe a content item in a specific direction, flick a content item, hover over a content item, provide a visual gesture, and/or speak a command, or any other gesture, or any combination thereof.

In some embodiments, the user may place content item 602 at the root level of file tree hierarchy 600. Root 604 may be a level including any collection of content items. For example, a user that swipes content item 602 into file tree hierarchy 600 may automatically place content item at the level of root 604. In some embodiments, root 604 may be a default level for content items to be placed. For example, if a user swiping a content item (e.g., content item 502 in the direction of arrow 510) inadvertently stops swiping before placing content item 602 in a specific branch or collection on file tree hierarchy 600, then content item 602 may automatically be placed at the level of root 604 by default. In some embodiments, root 604 may be a visual representation of the root level of file hierarchy 200 of FIG. 2. For example, root 604 may include one or more content items (e.g., content items 201-208 of FIG. 2), which each may include one or more attributes.

In some embodiments, file tree hierarchy 600 may include branches 606, 608, and 610, which may extend from root 604. It should be understood that although only three branches are shown, any number of branches and sub-branches may be included with file tree hierarchy 600 and the use of three branches is merely exemplary. In some embodiments, each branch may correspond to a separate collection of content items. For example, branch 608 may include content items that are photographs. In this scenario, each content item located on branch 608 may each have a similar type indicator (e.g., letter "P"). As another example, branches 606 and 610 may include content items that are music files and textual documents, respectively. In this scenario, content items included on branches 606 and 610 may each have similar type indicators (e.g., letter "M" for music files and letter "T" for textual files). Alternatively, the indicators may be purely iconic, such as, for example, one icon for text documents (e.g., a familiar word processing program's icon, or that of a well-known document viewing format), another of photographs, a third for videos, and a fourth for music files, as is known in the art. In some embodiments, each branch may include leaves which may correspond to content items included within a particular branch and/or sub-branch.

Figure 6B:
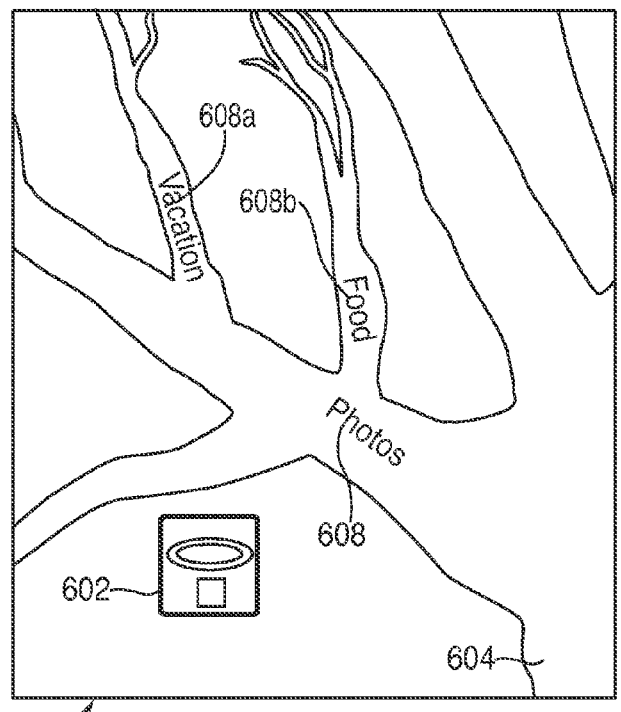
FIG. 6B is a schematic illustration of a zoomed-in portion of a branch of a file tree hierarchy in accordance with various embodiments.

FIG. 6B is a schematic illustration of a zoomed-in portion of a branch of file tree hierarchy 600 in accordance with various embodiments. In some embodiments, a user may place the selected content item (e.g., content item 602), in a branch or sub-branch of file tree hierarchy 600. For example, content item 602 may be a photograph and a user may want to place content item 602 with other photographs in the photo branch. In some embodiments, a user may drag or swipe content item 602 to a specific branch of file tree hierarchy 600 which includes photographs. For example, branch 608 may be a photo branch. A user may swipe content item 602 onto branch 608 thereby placing the content item in the grouping of content items corresponding to photos. Branch 608, which may include photographs, may be substantially similar to group 210 of FIG. 2 with the exception that branch 608 is a visual representation of a grouping or collection of photos.

In some embodiments, swiping content item 602 about branch 608 may automatically place the content item in the branch. For example, a user may swipe content item 602 into branch 608, at which point the user may end the swiping gesture. This may cause the content item to be placed generally in branch 608, and further grouping or organization of the content item may occur at another point in time. In some embodiments, a user may desire to add content item 602 to a specific collection of photographs and a sub-branch may represent a collection of content item from branch 608 that each may include similar attributes. For example, content item 602 may be a vacation photo or a photograph of a meal and may be placed in a collection of photographs that also include similar attributes as that of content item 602. Branch 608 may include sub-branches 608a and 608b. Sub-branch 608a may, for example, include vacation photographs whereas sub-branch 608b may include photographs of various meals and/or food. In some embodiments, a duplicate version of the content item may be placed within root 604. This may ensure that the original version of the content item remains unchanged. In some embodiments, pointers to the duplicate version of the content item may be placed in the various sub-branches. Thus, instead of moving around a sole copy or version of the content item, the content item (or duplicate version) may remain at the root level, and various pointers may be moved around the branches to direct the user to the content item/duplicate version of the content item as needed. This may also reduce the need for extra storage space, as the space required to store a pointer to a content item may be much smaller than a duplicate or multiple copies of a content item.

In some embodiments, each content item may include metadata (e.g., source indicators and/or share indicators, etc.) that may help categorize the content item into one or more sub-branches. For example, content item 602 may be a picture of food and may include metadata indicating such a characteristic making organization of the content items easier and more efficient. As another example, content item 602 may include metadata indicating multiple attributes of the content item and therefore the content item may be placed in various and/or multiple groups. An example of organization is described in U.S. patent application Ser. No. 13/888,186, entitled "Presentation and Organization of Content," filed on May 6, 2013, which is incorporated herein by reference in its entirety.

In some embodiments, metadata or indicators may be included with the content item received by the user. For example, user may receive a content item via an email or text message that may already include metadata tags or indicators that may specify attributes corresponding to the content item. For example, a user may receive content item 502 of FIG. 5A via a text message, which may have type indicator "P" signifying a photograph. Thus, once a user performs a swipe, a specific branch corresponding to photographs may automatically be displayed to the user allowing quick and efficient navigation of the file tree hierarchy. This may be especially useful on a mobile device where display real estate is at a premium and displaying an entire file tree hierarchy may be difficult. In some embodiments, the user may be presented with the entire file tree hierarchy and may navigate to a specific branch or sub-branch to place the content item. For example, a user may perform a finger roll to navigate content item 602 from root 604 to branch 608 to sub-branch 608b.

In some embodiments, placement of content items within specific branches and/or sub-branches within a content management system may automatically be synchronized to any client device associated with the content management system. For example, a user may place content item 602 within sub-branch 608b on content management system 100. Upon placement of content item 602, each user device having access to the content management system may automatically be updated to reflect the new addition to the content management system. In some embodiments, each user device may receive notification that the content item has been placed on the content management system. For example, the user may receive a pop-up notification signifying that content item 602 has been placed on branch 608. Each user device accessing the content management system may also receive a notification in response to the synchronization.

Figure 7A:
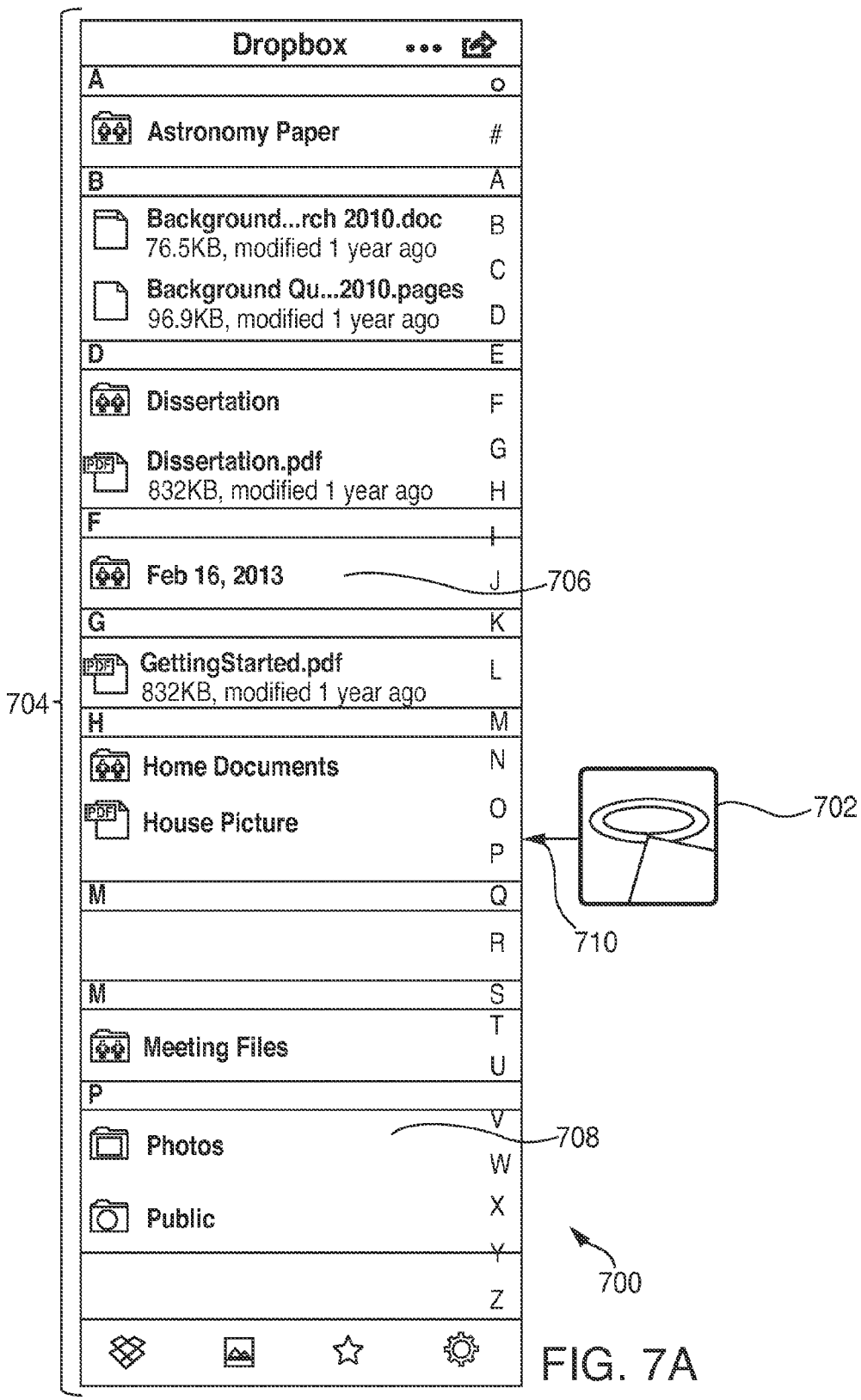
FIG. 7A is a schematic illustration of a file tree hierarchy in accordance with various embodiments.

FIG. 7A is a schematic illustration of a file tree hierarchy in accordance with various embodiments. File tree hierarchy 700 may include content items 704. Content items 704 may include various types of content items including, but not limited to, photographs, music files, textual documents, or any other type of content item, or any combination thereof. In some embodiments, content items 704 may include folders, directories, and/or collections which may themselves include one or more additional content items. In some embodiments, content items 704 may correspond to a root level of a file tree hierarchy (e.g., root level 604 of FIG. 6 and/or root level 200 of FIG. 2). Content items may initially be stored at the root level and/or may be stored at the root level by default when a user places the content item in the file tree hierarchy. For example, a user may swipe a content item, which may place it in a file tree hierarchy (e.g., content item 502 of FIG. 5) automatically at the root level.

In some embodiments, content items 704 may include branches or folders 706 and 708. Branches 706 and 708 may be substantially similar to branches 606 and 608 of FIG. 6A with the exception that the former are not displayed in a tree-like format. Branches 706 and 708 may, in some embodiments, include one or more additional content items and/or folders/sub-branches. In some embodiments, branches 706 and 708 may include groupings of content items that each have one or more similar attributes. For example, branch 708 may be a folder including photographs, and one or more content items included within branch 708 may have a type indicator corresponding to a photograph (e.g., type indicator 201a, "P").

In some embodiments, a user may provide a first gesture to select a content item from within a first application and then provide a second gesture to the content item to place it in a second application. For example, after a user swipes content item 502, which may be received via a text message, in the direction of arrow 510 of FIG. 5B, content item 502 may be placed in a content management system. In some embodiments, the placing may happen automatically, and the placement of the content item may be determined one or more predefined rules set within the content management system. In some embodiments, the content item and/or a duplicate version of the content item may be placed, using one or more additional gestures, at a root level, or in a root directory, of the content management system. For example, content item 702 may be dragged or swiped in the direction of arrow 710 placing content item 702 at the root level of file tree hierarchy 700. Content item 702 may then become one of the content items included within content items 704.

In some embodiments, a user may perform a gesture to a content item to place the content item in a specific branch or folder. For example, a user may swipe or drag content item 702 of FIG. 7A in the direction of arrow 710 to place it in branch 708. In some embodiments, the user may swipe content item 702 and place a pointer corresponding to the content item in branch 708. The original and/or duplicate version of the content item may remain at the root level 700. In some embodiments, content item 702 may be a specific type of content item (e.g., a photograph), and folder 708 may include one or more additional content items of the same type as content item 702. As content item 702 is dragged or swiped over folder 708, the contents of folder 708 may come to the foreground of the user's display.

Figure 7B:
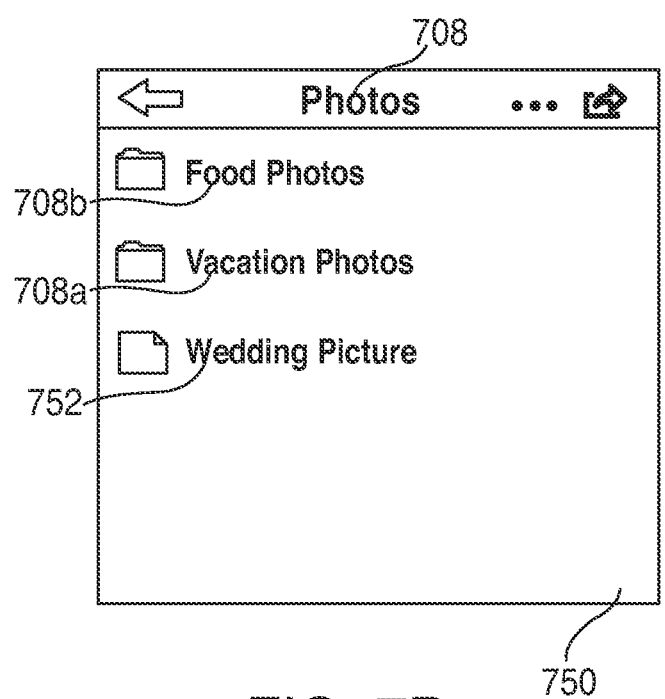
FIG. 7B is a schematic illustration of a file tree hierarchy in accordance with various embodiments

FIG. 7B is a schematic illustration of branch 708 of file hierarchy 700 in accordance with various embodiments. Branch view 750 may include the title of the branch as depicted at the root level. For example, if the content item is dragged to branch 708, branch view 750 may show a zoomed-in display of branch 708 and the contents included therein. The title of branch 708 may be displayed at the top of branch view 750.

In some embodiments, branch view 750 may include sub-branches or folders 708a and 708b as well as content item 752. Sub-branches 708a and 708b may be substantially similar to sub-branches 608a and 608b of FIG. 6B with the exception that the former may not be displayed in a tree-like format. A user may drag a content item, a duplicate version of a content item, and/or a pointer to a content item, into branch 708 or into one of sub-branches 708a and 708b using one or more gestures. In some embodiments, the user may place the content item, duplicate version of the content item, and/or pointer to the content item, at the branch level and not in a particular sub-branch. For example, content item 752 may be a content item included within branch 708 but may not be placed into sub-branches 708a and/or 708b.

Figure 8:
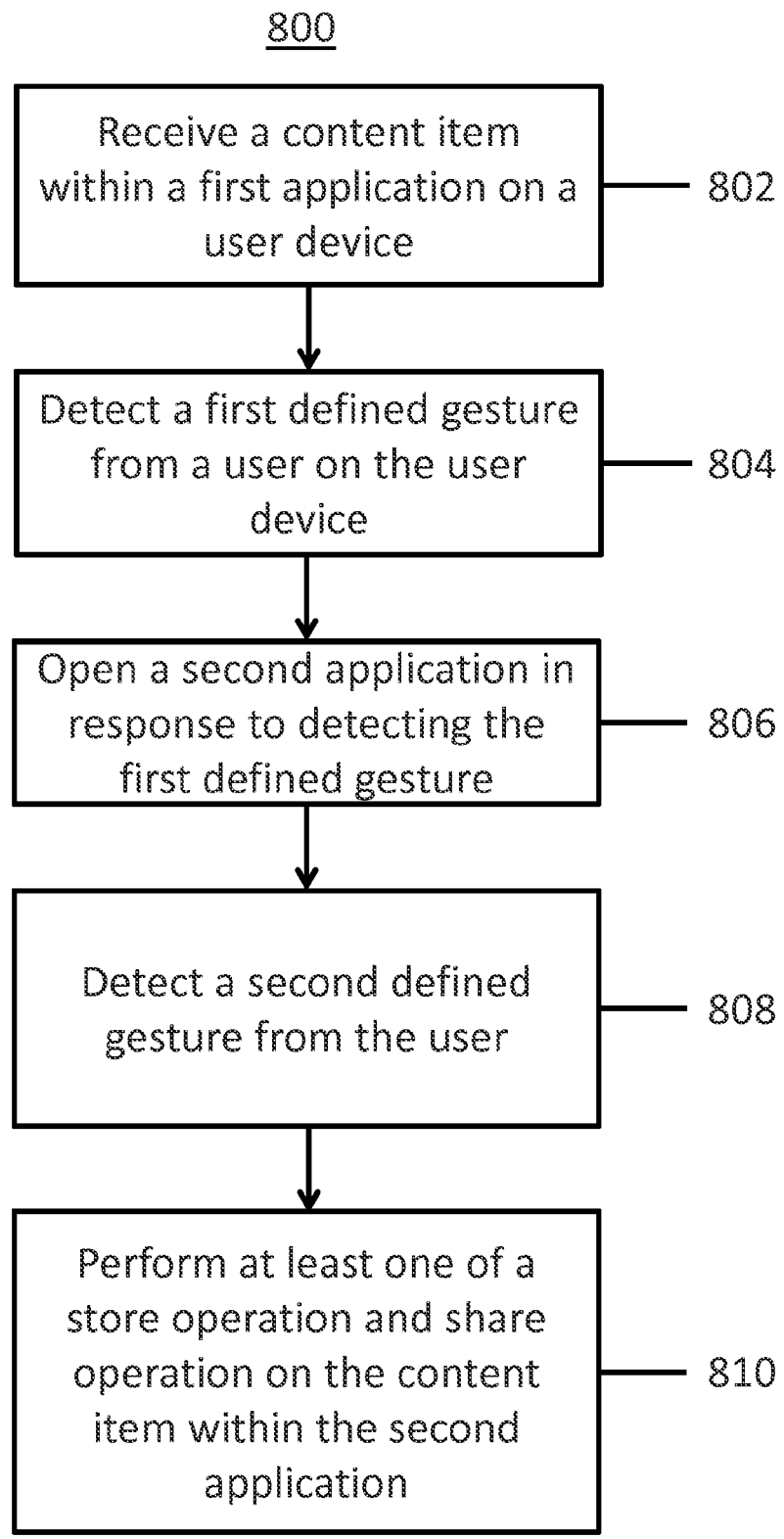
FIG. 8 is an illustrative flowchart of a process that uses gestures to perform operations within an application in accordance with various embodiments.

FIG. 8 is an illustrative flowchart of a process that uses gestures to perform operations within an application in accordance with various embodiments. Process 800 may begin at step 802. At step 802, a content item may be received within a first application on a user device. Examples of the first application include, but are not limited to, an SMS messaging application, an email application, a chat, a browser accessing a service (e.g., an e-book service, an audio download service, a video download service, and an article download service), one or more third party applications, one or more social media networks, or any other application, or any combination thereof. The content item may be any content item including, but not limited to, photographs, textual documents, videos, music files, one or more shared documents, one or more pointers to data or items stored or referenced within a web service provider, a URL link, or any other content item type, or any combination thereof. For example, a user may receive a photograph within a text message from a contact of the user.

At step 804, a first defined gesture may be detected from a user of the user device. In some embodiments, the first defined gesture may be detected by a touch-sensing display interface on the user device. Various touch-sensing display interfaces may include, but are not limited to, liquid crystal displays (LCD), monochrome displays, color graphics adapter (CGA) displays, enhanced graphics adapter (EGA) displays, variable-graphics array (VGA) displays, or any other display, or any combination thereof. In some embodiments, the touch-sensing display interface may include a multi-touch panel coupled to one or more processors to receive gestures. Multi-touch panels, for example, may include capacitive sensing mediums having a plurality of row traces or driving line traces, and a plurality of column traces or sensing lines. Although multi-touch panels are described herein as one example for touch-sensing display interface, it should be understood that any touch-sensing display interface known to those skilled in the art may be used.

In some embodiments, the first defined gesture may be a "long press". For example, a user may contact the touch-sensing display interface for a predefined period of time. In some embodiments, the first gesture may include the user providing a long press with one or more fingers. For example, a user may press down on the touch-sensing display interface with two fingers. In some embodiments, the user may provide a hover gesture, a visual motion, an audio command, or any other gesture, or any combination thereof. An example of gestures and objects that may perform gestures is provided in U.S. patent application Ser. No. 13/965,734, entitled "Gestures for Selecting a Subset of Content Items," filed on Aug. 8, 2013, which is incorporated herein by reference in its entirety.

At step 806, a second application may open in response to the first defined gesture being detected. Examples of the second application may include, but are not limited to, a content management system, a social media network, an SMS messaging application, an email application, or any other application, or any combination thereof. For example, a user may perform a long press after receiving a photograph on the user device and, in response, a content management system may open on the user device. In some embodiments, the user may be directed to a dedicated application corresponding to the content management system (e.g., content management application 114). In some embodiments, the second application may correspond to a content management system and may open as a file tree hierarchy. For example, a user may be presented with file tree hierarchy 600 of FIG. 6A within the content management system in response to providing the first defined gesture. In some embodiments, the user may be required to provide an additional gesture to open the second application. For example, the user may swipe the content item received in the text message in a specific direction, which may open the content management system. In some embodiments, the second application may open automatically in response to detecting the first gesture.

At step 808, a second defined gesture from the user may be detected. In some embodiments, the second defined gesture may be a swipe, a flick, a pinch, a lasso, a pivot, or any other gesture detectable by a touch-sensing display interface. In some embodiments, the second defined gesture may be a hover motion, a motion detected by a motion tracking system, a visual motion (e.g., an optical motion detected by an eye-tracking system), an audio command, or any other gesture, or any combination thereof. For example, after the second application opens, the user may swipe the content item. As another example, after the second application opens, the user may provide a finger roll to navigate about the second application. In some embodiments, the second defined gesture may be substantially similar to the first defined gesture, and the previous description of the latter may apply to the former.

At step 810, at least one of a store operation and a share operation may be performed on the at least one content item within the second application. The store operation may store the at least one content item in the second application. For example, a user may save and/or store a content item (e.g., a photograph) on a content management system. In some embodiments, the saved content item may be a duplicate version of the content item created in response to the second gesture being detected. The share application may share the at least one content item with a contact associated with the user, a social media network, or any other sharing application, or any combination thereof. Sharing may occur using any suitable means including, but not limited to, via the same first application, a different application than the first application, a third party application, a content management system, or any other sharing mechanism, or any combination thereof. For example, the user device may detect the a swipe of content item 502 of FIG. 5B in the direction of arrow 512 and automatically provide one or more sharing options to the user. An example of sharing is described in U.S. patent application Ser. No. 13/888,157, entitled "Managing Shared Content with a Content Management System," filed on May 6, 2013, and which is incorporated herein by reference in its entirety.

In some embodiments, in response to detecting the second defined gesture from the user, the content item may be assigned to a collection within the second application. For example, the content item may be a photograph and in response to detecting a swipe of the content item, the photograph may be assigned to a collection of photographs within the content management system. In some embodiments, the content item may be assigned to a specific collection based on one or more attributes or identifiers associated with the content item. For example, the content item may include metadata indicating that the content item pertains to a specific event or time frame. In response to detecting the second gesture (e.g., a swipe), the content item may be assigned to a collection of other content items that also include similar metadata (e.g., a timestamp) pertaining to the same specific event or time frame. It should be understood to those skilled in the art that any attribute may be associated with a content item, and any assignment or grouping of content items may occur based on any attribute or attributes.

In some embodiments, upon detecting the first defined gesture, the content item may modify in visual appearance to indicate that the first gesture has been performed. For example, a user may provide a long press to content item 502 of FIG. 5 and in response, content item 502 may become outlined by outline 506. As another example, the content time may become brighter, may be viewed in a separate display screen on the user device, and/or may change in size (e.g., become larger).

In some embodiments, in response to the operation being performed on the content item or items, a modified file hierarchy, branch, and/or sub-branch on the second application may be synchronized with an authorized account of the user associated with the second application. For example, following content item 602 being saved to branch 608 on file tree hierarchy 600, a modified file tree hierarchy may be synchronized with an authorized account of a user of a content management system (e.g., content management system 100). In some embodiments, the synchronization may occur automatically in response to the action being performed. For example, the synchronization may automatically occur with the account of the user associated with the content management system. The synchronization may also occur with one or more additional user devices that the client of the content management system may reside. For example, a user may have multiple devices that may have either access to the content management system via a web browser and/or a dedicated application associated with the content management system and the synchronization may occur across all the devices. In some embodiments, the synchronization may occur manually via a prompt from the user and/or periodically at specific time intervals.

Figure 9:
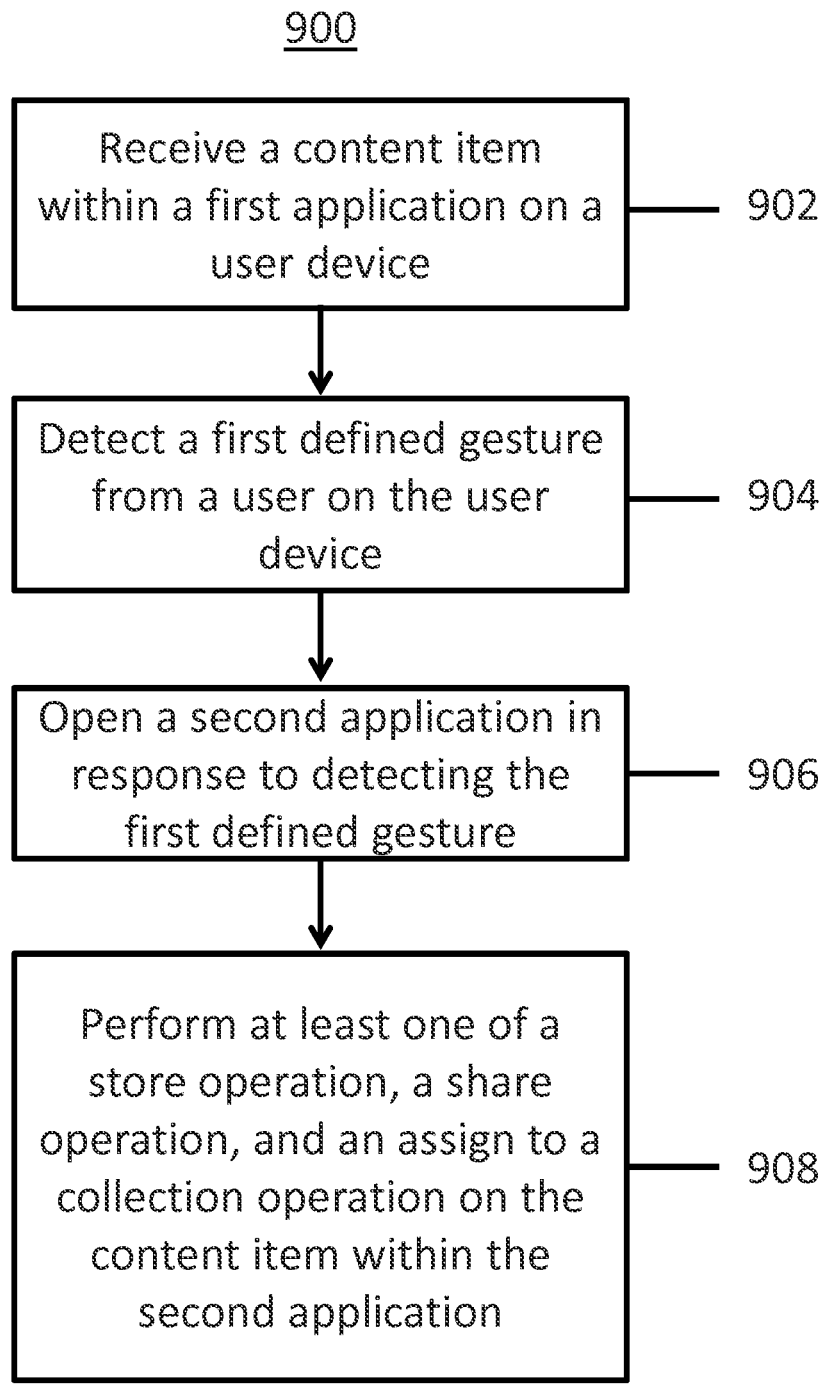
FIG. 9 is an illustrative flowchart of a process that uses gestures to perform operations on content items in accordance with various embodiments.

FIG. 9 is an illustrative flowchart of a process that uses gestures to perform operations on content items in accordance with various embodiments. Process 900 may begin at step 902. At step 902, a content item may be received within a first application on a user device. At step 904, a first gesture may be detected from the user on the user device. At step 906, a second application may open in response to detecting the first defined gesture. Step 902-906 may be substantially similar to steps 802-806 of FIG. 8, and the previous description of the latter may apply to the former.

At step 908, at least one of a store operation, a share operation, and/or an assign to a collection operation may be performed on the content item within the second application. In some embodiments, the operation performed on the content item may occur automatically and/or without an additional user gesture. For example, a photograph may be received in a text message. In response to receiving the photograph, the user may provide a long press to the photograph which may open a content management system. The content item may then be assigned to a collection of photographs on the content management system in response to the second application opening, thus providing a seamless and efficient transition for the user. This may be especially beneficial for a user wanting to expedite their work and/or a user who may not be able to input an additional gesture to the perform an operation. In some embodiments, a duplicate version of the content item may be created and uploaded to the second application (e.g., content management system 100).

In some embodiments, the content item may be assigned to a specific collection within the second application based on one or more attributes or indicators associated with the content item. For example, the content item may be a photograph including a timestamp. The photograph may then be assigned to a collection of other photographs which may also include similar timestamps. In some embodiments, a duplicate version of the content item may be uploaded to the second application (e.g., content management system 100), and a pointer to the duplicate version may be placed in the assigned collection.

In some embodiments, the opening of the second application and the performed action may occur simultaneously. For example, a photograph may be received in a text message and a user may provide a long press to the photograph. In response to detecting the long press, a content management system may open and the photograph may be stored, saved, shared, or assigned to a specific collection of the content management system. In some embodiments, the content item may include metadata (e.g., a timestamp), which may allow the appropriate operation to quickly place the content item within the second application.

In some embodiments, the second application may open in a specific collection or branch of the second application where the content item may be stored or assigned. For example, the content item may be a music file and the second application may be a music player. The music player may automatically open in a playlist associated with the received content item. In some embodiments, the second application may learn the type of content item received and thereby place the content item (or a duplicate version of the content item, or a pointer to the original or duplicate version of the content item) in a specific location within the second application based on the learning. For example, a user may continually receive music files from a music download service. In this scenario, the second application may be a music player which learns that anytime a music file is downloaded from the music download service, automatically place the music file in a specific playlist. Thus, upon performing the first gesture, the music player may open in the playlist including the music file. This may allow the user to perform any additional action on the music file such as, for example, move the file to another playlist, share the music file, make a copy of the music file, or any other action, or any combination thereof. The aforementioned example is not limited to just music files and music players, and those skilled in the art will understand that many different types of content items and applications may be used instead.

Figure 10:
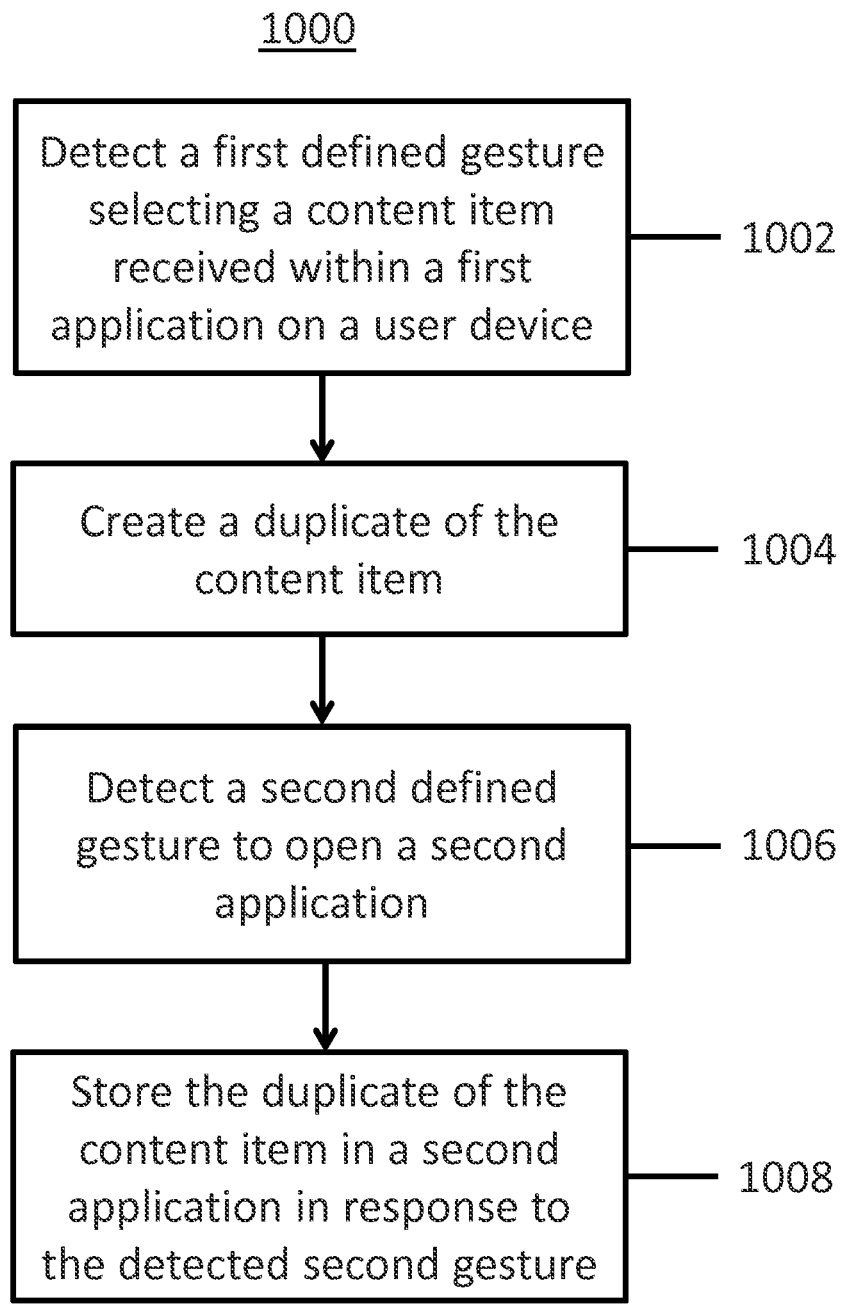
FIG. 10 is an illustrative flowchart of a process that uses gestures to store content items in accordance with various embodiments.

FIG. 10 is an illustrative flowchart of a process that uses gestures to store content items in accordance with various embodiments. Process 1000 may begin at step 1002. At step 1002, a first defined gesture may be detected selecting a content item received within a first application on a user device. In some embodiments, the first application may be an SMS messaging application, an email application, a browser that access a service, or any other type of application, or any combination thereof. For example, a user may receive a photograph via a text message.

In some embodiments, the first defined gesture may be a gesture defined on the user device by the user and/or the user device. One or more rules may be implemented in the user device indicating how one or more processors incorporated within the user device may behave in response to a specific gesture (or gestures) being detected. In some embodiments, gestures may include long presses, taps, hard presses, flicks, swipes, presses with one or more fingers, presses for a predefined period of time, hover gestures, audio commands, a visual gestures, or any other gesture, or any combination thereof. For example, a user may contact a touch-sensing display interface, or touch screen, of the user device with a finger for a period of time, thereby selecting a content item received within an application (e.g., a photograph received via an email). Any suitable object may contact the user device or provide the gesture. For example, object may include, but are not limited to, one or more fingers, a stylus, and/or a computer compatible pen.

At step 1004, a duplicate version of the content item may be created. In some embodiments, the duplicate version of the content item may be created in response to the first gesture being detected. The duplicate version of the content item may be stored, for example, in temporary memory on the user device prior to transmission. In some embodiments, instructions may be included and/or received by the first application that instruct the application to generate a duplicate version of the selected content item in response to detecting the first defined gesture. In some embodiments, a second application may provide the instructs received by the first application.

At step 1006, a second defined gesture may be detected on the user device that opens a second application. In some embodiments, the second gesture may include a swipe, a flick, a tap, a finger roll, an audio command, a hand wave, or any other gesture or any combination thereof. The second gesture may be performed on the duplicate version of the content item. For example, a user may provide a long press to a photograph received in a text message and a duplicate version may be temporarily created, which the user may then swipe. In some embodiments, the duplicate version may be created and presented along with the original version. For example, the duplicate version may automatically be created in response to the first gesture's detection, and the duplicate version may ostensibly be displayed in parallel or instead of the original version of the content item.

In some embodiments, the second application may be a content management system and the detected second gesture may open the content management system. For example, a user may swipe content item 502 in the direction of arrow 510 and a content management system may open. In some embodiments, the second application may be an application residing on the user device. For example, if a user swipes content item 502 in the direction of arrow 512 then an application on the user's device may open (e.g., a music player). The second may be any application residing either locally on the user device (e.g., client devices 102 of FIG. 1) remotely on a content management system (e.g., content management system 100), or externally on a third-party application.

In some embodiments, the second application may provide instructions to the first application to create the duplicate version of the content item. For example, content management application 114 may provide instructions to one or more native applications on client electronic devices 102. The instructions may inform the native applications, such as a messaging application, that in response to detecting the first gesture, create a duplicate version of the content item. The instructions may then inform the application to place the duplicate version of the content item into content management application 114. Content management application 114 may also include instructions therein instructing content management application 114 to upload the duplicate versions of the content item to content management system 100.

At step 1008, the duplicate version of the content item may be stored in the second application in response to the second gesture being detected. In some embodiments, the user may provide the gesture which opens the second application and stores the content item in the second application. For example, if the user swipes content item 502 in the direction of arrow 512, the second application may open and the user may store the duplicate version of the content item in the second application. Storing the duplicate version of the content item may be beneficial because this may leave the original version of the content item in the first application. For example, a user may receive an email containing a document and, via steps 1002-1006, place a duplicate version of the document in a content management system while keeping the original version in the email application.

In some embodiments, the duplicate version of the content item may be placed in a specific branch or collection within the second application. One or more attributes or indicators may be included within the content item, and the content item may be placed in a branch or collection of content items that each include similar attributes or indicators. In some embodiments, the content item may be placed in a specific branch or collection using a third gesture. In some embodiments, a pointer to the duplicate version of the content item may be stored in the second application and may be placed within a branch or collection.

Figure 11:
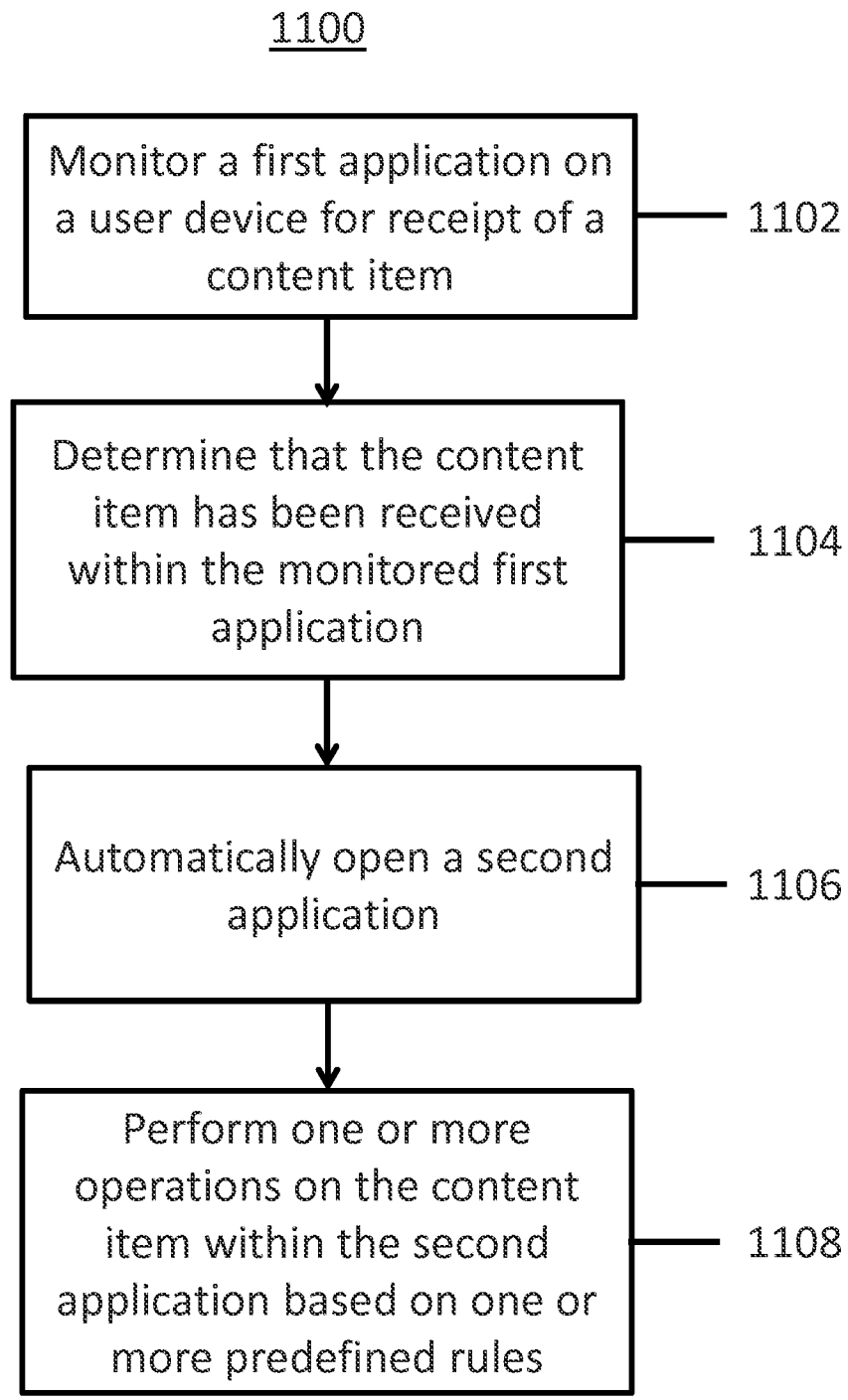
FIG. 11 is an illustrative flowchart of a process that performs operations on content items based on monitoring received content in accordance with various embodiments.

FIG. 11 is an illustrative flowchart of a process that performs operations on content items based on monitoring received content in accordance with various embodiments. Process 1100 may begin at step 1102. At step 1102, a first application on a user device may be monitored for the receipt of a content item or content items. In some embodiments, the monitoring may be continually performed, periodically performed, or manually performed. For example, a user may monitor their email continually for content items. In some embodiments, the user may be notified when a content item is received by the first application. For example, if a user receives an email including a photograph, the user may receive a pop-up notification to inform the user that the email including the photograph has been received.

In some embodiments, one or more rules may be defined that determine one or more types of content items, or specific attributes associated with content items, to be monitored for. For example, a user may monitor for receipt of any document from a specific contact (e.g., a user's co-worker). This may help reduce the amount of content items that may need to be parsed through, however the first application may be monitored for all content items received.

At step 1104, a determination may be made as to whether the content item has been received within the monitored first application. The first application may be continually, periodically, and/or manually monitored for receipt of content items. For example, a user may decide to have an email application continually monitored, or the user may decide to have the email application checked every hour. In still another example, the user may manually check the first application (e.g., logging into an email account via a web browser). In some embodiments, steps 1102 and 1104 may be performed substantially simultaneously.

In some embodiments, all communications associated with the first application may be monitored to determine if a content item or content items have been received. In some embodiments, monitoring of the first application may include monitoring more than one application to determine if a content item has been received. For example, a user may be taking part in a video chat with a contact and, while the video chat is occurring, the contact may send the user an email or an attachment in a message. The video chat and email and/or the video chat and another application may therefore be monitored to determine whether the content item has been received.

In some embodiments, the communications occurring within the first application may be monitored for key phrases signifying that a content item may be received. In this scenario a two-phased monitoring process may occur. For example, a user and a contact of the user may be involved in a video chat, where the video chat can be monitored for phrases. The contact may say to the user, for example, "I am sending you a file," or "I'm sending you an email." In response to detecting these phrases, which may contain key words such as "file" or "email," an email application or another application may be monitored for receipted of the content item to be sent. A determination may also be made once the content item has been received. This way, a user may not be required to monitor an application for receipt of a content item, but may be notified or may become aware of the receipt of the content item. This may be beneficial because the application may not need to be continually monitored, and monitoring my occur only in response to detection of a specific key word or phrase.

At step 1106, a second application may automatically open. In some embodiments, the second application may automatically open in response to the determination that the content item has been received within the first application. In some embodiments, the second application may open at substantially the same time as the determination or after the determination.

At step 1108, an operation may be performed on the content item within the second application based on one or more predefined rules. In some embodiments, the operation may be a storing operation, a sharing operation, and/or an assign to a collection operation. For example, the content item that received in the first application may be saved to the second application, shared with and/or to the second application, or placed in a specific branch on the second application.

In some embodiments, the one or more predefined rules may determine which operation may be performed on the content item. The predefined rules may be set by the user, the user device, the first application, and/or the second application and may be changed or augmented at any point. For example, the user may define a rule that whenever a content item has been received in the first application, it may automatically be saved to the second application. In some embodiments, the predefined rule or rules may determine a certain operation may be performed on a specific type of content item. For example, a rule may be implemented that all photos received are to be stored in a photographs folder, whereas all music files are to be stored in a music folder.

Figure 12:
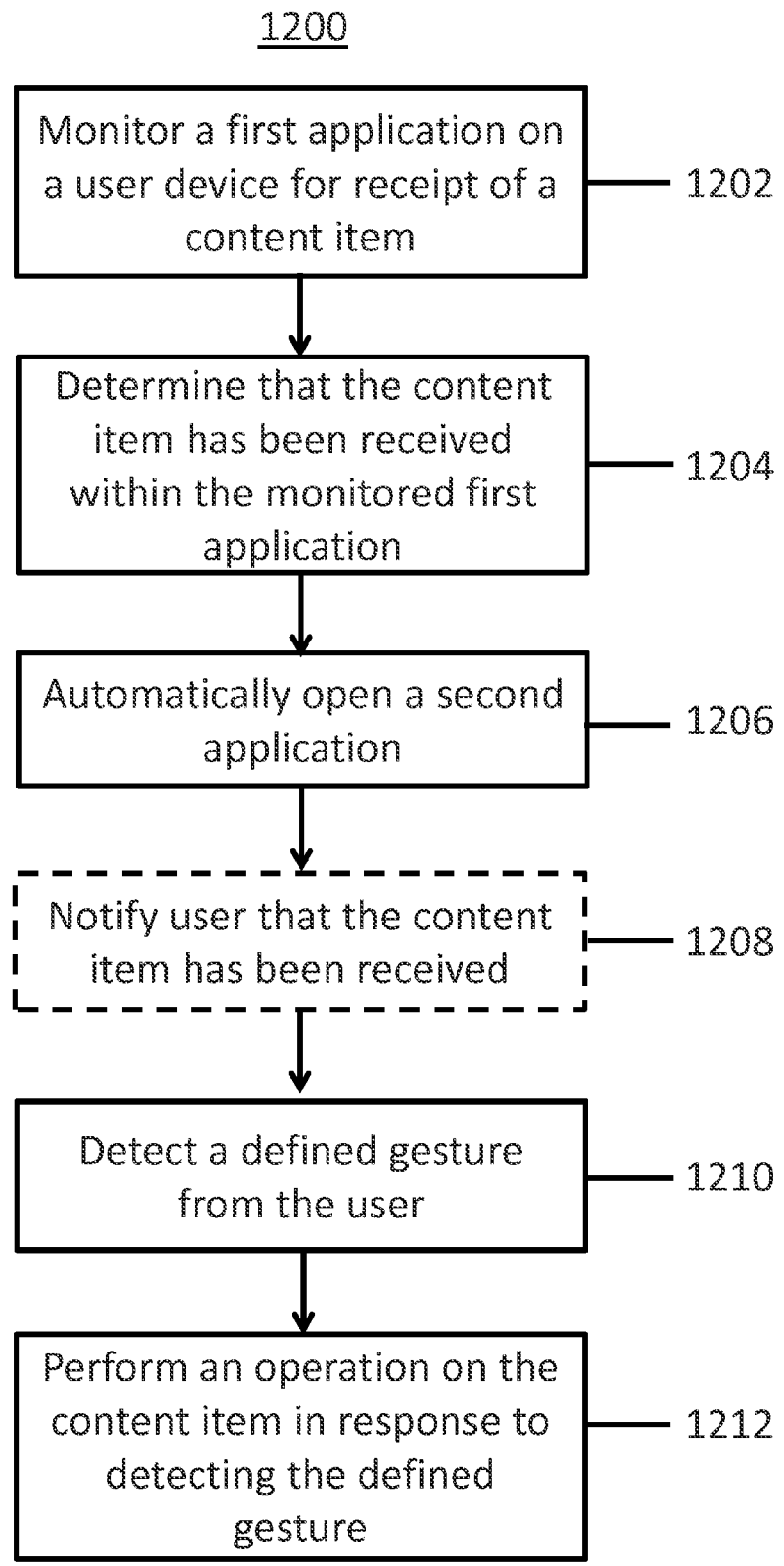
FIG. 12 is an illustrative flowchart of a process that performs operations on content items based on monitoring received content and detected gestures in accordance with various embodiments.

FIG. 12 is an illustrative flowchart of a process that performs operations on content items based on monitoring received content and detected gestures in accordance with various embodiments. Process 1200 may begin at step 1202. At step 1202, a first application may be monitored for the receipt of a content item. At step 1204, a determination may be made as to whether the content item has been received within the monitored first application. At step 1206, a second application may automatically be opened on the user device. In some embodiments, steps 1202, 1204, and 1206 may be substantially similar to steps 1102, 1104, and 1106 of FIG. 11, and the previous descriptions of the latter may apply to the former.

At optional step 1208, the user may receive a notification that the content item has been received. In some embodiments, the notification may be a pop-up notification informing the user that the content item has been received. In other embodiments, the notification may be an audible sound, a message, an email, or any other notification, or any combination thereof. In some embodiments, notification that the content item has been received may occur at substantially the same time as the opening of the second application. In some embodiments, the notification may occur immediately after the determination that content item has been received. For example, step 1208 may, in some embodiments, follow step 1204 and precede step 1206. In some embodiments, step 1208 may not occur, and no notification may be presented to the user.

At step 1210, a defined gesture from the user may be detected. In some embodiments, the gesture may be detected by a touch-sensing display interface on the user device. In some embodiments, the defined gesture may be a swipe, a tap, a flick, a finger roll, a hover motion, an voice command, a hand wave, or any other gesture, or any combination thereof. In some embodiments, the defined gesture may include multiple gestures. For example, a first gesture may select the content item and a second gesture may then be performed to the content item.

At step 1212, an operation may be performed in response to the defined gesture being detected. In some embodiments, the operation may include one of a storing operation, a sharing operation, or an assignment to a collection operation. In some embodiments, the operation may be performed automatically in the second application in response to the gesture being detected. For example, one or more rules may be defined on the user device that associated a specific gesture with a specific action to take place with the content item. In some embodiments, in response to detecting the defined gesture, a duplicate version of the content item may be created. The duplicate version of the content item may then have the operation performed unto it, while the original version remains unchanged. In some embodiments, the changes performed to the duplicate version may be synced to all devices accessing the second application (e.g., a content management system).

Exemplary Systems

In exemplary embodiments of the present invention, any suitable programming language may be used to implement the routines of particular embodiments including C, C++, Java, JavaScript, Python, Ruby, CoffeeScript, assembly language, etc. Different programming techniques may be employed such as procedural or object oriented. The routines may execute on a single processing device or multiple processors. Although the steps, operations, or computations may be presented in a specific order, this order may be changed in different particular embodiments. In some particular embodiments, multiple steps shown as sequential in this specification may be performed at the same time Particular embodiments may be implemented in a computer-readable storage device or non-transitory computer readable medium for use by or in connection with the instruction execution system, apparatus, system, or device. Particular embodiments may be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments may be achieved by any means as is known in the art. Distributed, networked systems, components, and/or circuits may be used. Communication, or transfer, of data may be wired, wireless, or by any other means.

It will also be appreciated that one or more of the elements depicted in the drawings/figures may also be implemented in a more separated or integrated manner, or even removed or rendered as inoperable in certain cases, as is useful in accordance with a particular application. It is also within the spirit and scope to implement a program or code that may be stored in a machine-readable medium, such as a storage device, to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While there have been described methods using heuristics to select and save content items to a synced content management system, it is to be understood that many changes may be made therein without departing from the spirit and scope of the invention. Insubstantial changes from the claimed subject matter as viewed by a person with ordinary skill in the art, no known or later devised, are expressly contemplated as being equivalently within the scope of the claims. Therefore, obvious substitutions now or later known to one with ordinary skill in the art are defined to be within the scope of the defined elements. The described embodiments of the invention are presented for the purpose of illustration and not of limitation.

What is claimed:

1. A method for assigning a content item to a content item collection under management of a content management system, comprising:
    at a computing device comprising a touch screen display, one or more processors and memory storing a first application executed by the one or more processors to perform the method, performing operations comprising:
    after the first application is opened, entering a first application state comprising a plurality of content item collection indicators displayed on the touch screen display;
    after entering the first application state, detecting a first touch gesture directed to one content item collection indicator of the plurality of content item collection indicators;
    wherein each content item collection indicator, of the plurality of content item collection indicators, represents one content item collection, of a plurality of content item collections, under management of the content management system;
    wherein performance of an earlier touch gesture directed to a graphical representation of a content item, displayed on the touch screen display by a second application of the computing device that is not the first application, causes the first application to open and enter the first application state;
    after detecting the first touch gesture, assigning a copy of the content item to the content item collection, of the plurality of content item collections, represented by the one content item collection indicator to which the first touch gesture is directed.

2. The method of claim 1, wherein the second application comprises at least one of an SMS message, an email, a chat, and a browser accessing at least one of: an e-book service, a music download service, an audio download service, a video download service, and an article download service.

3. The method of claim 1, wherein the first application state comprises a graphical representation of the content item displayed on the touch screen display.

4. The method of claim 1, wherein the first touch gesture or the earlier touch gesture comprises one of a long press, a long hover, and a two finger press of defined duration.

5. The method of claim 1, wherein assigning the copy of the content item comprises storing the copy of the content item in a file system folder of the computing device that is configured for synchronization with the content item collection represented by the one content item collection indicator to which the first touch gesture is directed.

6. The method of claim 1, wherein at least two content item collections, of the plurality of content item collections, are associated with two different user accounts held with the content management system.

7. The method of claim 1, wherein the content item collection to which the copy of the content item is assigned is a virtual collection.

8. The method of claim 1, further comprising:
    based on metadata for the content item, selecting the plurality of content item collections for inclusion in a set of a plurality of content item collections to be represented, on the touch screen display, in the first application state, by content item collection indicators.

9. The method of claim 1, wherein the first application opens and enters the first application state, in response to performance of the earlier touch gesture.

10. The method of claim 1, wherein the first touch gesture and the earlier touch gesture are the same type of touch gesture.

11. The method of claim 1, further comprising:
    in response to detecting the first touch gesture, assigning the copy of the content item to the content item collection, of the plurality of content item collections, represented by the one content item collection indicator to which the first touch gesture is directed.

12. The method of claim 1, wherein each content item collection indicator, of the plurality of content item collection indicators, visually indicates a name of the content item collection, of the plurality of content item collections, represented by the each content item collection indicator.

13. One or more non-transitory computer-readable media storing a first application for execution by one or more processors of a computing device comprising a touch screen display, the first application comprising instructions for:

after the first application is opened, entering a first application state comprising a plurality of content item collection indicators displayed on the touch screen display;

after entering the first application state, detecting a first touch gesture directed to one content item collection indicator of the plurality of content item collection indicators;

wherein each content item collection indicator, of the plurality of content item collection indicators, represents one content item collection, of a plurality of content item collections, under management of a content management system;

wherein performance of an earlier touch gesture directed to a graphical representation of a content item, displayed on the touch screen display, by a second application of the computing device that is not the first application, causes the first application to open and enter the first application state;

after detecting the first touch gesture, assigning a copy of the content item to the content item collection, of the plurality of content item collections, represented by the one content item collection indicator to which the first touch gesture is directed.

14. The one or more non-transitory computer-readable media of claim 13, wherein the second application comprises at least one of an SMS message, an email, a chat, and a browser accessing at least one of: an e-book service, a music download service, an audio download service, a video download service, and an article download service.

15. The one or more non-transitory computer-readable media of claim 13, wherein the first application state comprises a graphical representation of the content item displayed on the touch screen display.

16. The one or more non-transitory computer-readable media of claim 13, wherein the first touch gesture or the earlier touch gesture comprises one of a long press, a long hover, and a two finger press of defined duration.

17. The one or more non-transitory computer-readable media of claim 13, wherein assigning the copy of the content item comprises storing the copy of the content item in a file system folder of the computing device that is configured for synchronization with the content item collection represented by the one content item collection indicator to which the first touch gesture is directed.

18. The one or more non-transitory computer-readable media of claim 13, wherein at least two content item collections, of the plurality of content item collections, are associated with two different user accounts held with the content management system.

19. The one or more non-transitory computer-readable media of claim 13, wherein the content item collection to which the copy of the content item is assigned is a virtual collection.

20. The one or more non-transitory computer-readable media of claim 13, the first application further comprising instructions for:

based on metadata for the content item, selecting the plurality of content item collections for inclusion in a set of a plurality of content item collections to be represented, on the touch screen display, in the first application state, by content item collection indicators.

21. The one or more non-transitory computer-readable media of claim 13, wherein the first application opens and enters the first application state, in response to performance of the earlier touch gesture.

22. The one or more non-transitory computer-readable media of claim 13, wherein the first touch gesture and the earlier touch gesture are the same type of touch gesture.

23. The one or more non-transitory computer-readable media of claim 13, the first application further comprising instructions for:

in response to detecting the first touch gesture, assigning the copy of the content item to the content item collection, of the plurality of content item collections, represented by the one content item collection indicator to which the first touch gesture is directed.

24. The one or more non-transitory computer-readable media of claim 13, wherein each content item collection indicator, of the plurality of content item collection indicators, visually indicates a name of the content item collection, of the plurality of content item collections, represented by the each content item collection indicator.

* * * * *